(12) United States Patent
Yamada et al.

(10) Patent No.: US 6,829,122 B2
(45) Date of Patent: Dec. 7, 2004

(54) MAGNETIC HEAD OF A MAGNETORESISTANCE TYPE HAVING AN UNDERLYING LAYER HAVING A LAMINATED STRUCTURE OF A TUNGSTEN-GROUP METAL LAYER FORMED ON A TANTALUM-GROUP METAL LAYER

(75) Inventors: Kenichiro Yamada, Kawasaki (JP); Naoki Mukoyama, Kawasaki (JP); Hidehiko Suzuki, Kawasaki (JP); Hitoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 09/961,594

(22) Filed: Sep. 24, 2001

(65) Prior Publication Data

US 2002/0109948 A1 Aug. 15, 2002

(30) Foreign Application Priority Data

Feb. 15, 2001 (JP) ........................ 2001-039248
Jul. 30, 2001 (JP) ........................ 2001-230049

(51) Int. Cl.$^7$ ............................................... G11B 5/39
(52) U.S. Cl. ............................................... 360/324.12
(58) Field of Search ........................ 360/324.1, 324.11, 360/324.12, 324.2, 317

(56) References Cited

U.S. PATENT DOCUMENTS

| | | | | |
|---|---|---|---|---|
| 5,959,810 A | * | 9/1999 | Kakihara et al. | ...... 360/324.12 |
| 5,995,338 A | * | 11/1999 | Watanabe et al. | ...... 360/324.12 |
| 6,094,325 A | | 7/2000 | Tagawa et al. | ............. 360/113 |
| 6,278,595 B1 | * | 8/2001 | Xue et al. | ............. 360/327.31 |
| 6,385,017 B1 | * | 5/2002 | Min et al. | ............. 360/324.12 |
| 6,456,468 B1 | * | 9/2002 | Hayashi | .................... 360/324.1 |
| 6,477,020 B1 | * | 11/2002 | Aoshima et al. | ........ 360/327.31 |
| 6,493,197 B2 | * | 12/2002 | Ito et al. | ................. 360/324.12 |
| 6,556,391 B1 | * | 4/2003 | Aoshima et al. | ....... 360/324.12 |
| 6,577,477 B1 | * | 6/2003 | Lin | ........................ 360/324.12 |
| 6,587,315 B1 | * | 7/2003 | Aoki et al. | .................. 360/322 |
| 6,591,481 B2 | * | 7/2003 | Shimazawa et al. | ..... 29/603.18 |

FOREIGN PATENT DOCUMENTS

| | | |
|---|---|---|
| DE | 198 33 275 | 7/1999 |
| EP | 0 690 439 | 1/1996 |
| EP | 0 790 600 | 8/1997 |
| JP | 9-16918 | 1/1997 |
| JP | 10-91920 | 4/1998 |
| JP | 10-124823 | 5/1998 |
| JP | 10-154314 | 6/1998 |
| JP | 22-120520 | 4/1999 |
| JP | 2000 057526 | 2/2000 |
| JP | 2000 090419 | 3/2000 |
| JP | 2000-99926 | 4/2000 |
| JP | 2000-132817 | 5/2000 |
| JP | 2000-200404 | 7/2000 |
| JP | 2000-228002 | 8/2000 |
| JP | 2000-285419 | 10/2000 |

* cited by examiner

*Primary Examiner*—Jefferson Evans
(74) *Attorney, Agent, or Firm*—Greer, Burns & Crain, Ltd.

(57) ABSTRACT

A magnetic head of a magnetoresistance type is provided. The magnetic head comprises a magnetoresistance film, an underlying layer formed on each of both sides of the magnetoresistance film, and a magnetic-domain regulating film formed on the underlying layer so as to regulate a magnetic domain of a free magnetic layer in the magnetoresistance film. The underlying layer has a laminated structure of a tungsten-(W)-group metal layer formed on a tantalum-(Ta)-group metal layer. The underlying layer is formed so thick as to arrange the magnetic-domain regulating film at a position corresponding to the free magnetic layer.

6 Claims, 21 Drawing Sheets

MAGNETIC HEAD OF A MAGNETORESISTANCE TYPE HAVING AN UNDERLYING LAYER HAVING A LAMINATED STRUCTURE OF A TUNGSTEN-GROUP METAL LAYER FORMED ON A TANTALUM-GROUP METAL LAYER

BACKGROUND OF THE INVENTION

1. Field of the Invention

The present invention generally relates to a magnetic head, and, more particularly, to a magnetic head used in reproducing magnetically recorded information from a magnetic recording medium such as a hard disk.

2. Description of the Related Art

A magnetic recording and reproducing device, such as a magnetic disk device, is widely employed as an external recording and reproducing device of a computer. Recently, as such a magnetic recording and reproducing device has drastically come to have a mass capacity, a magnetic recording medium has come to have a sharply increased recording density. Accordingly, there have been increasing needs for a magnetic head capable of providing a high performance. A magnetic head of a magnetoresistance type (an MR head) is drawing attention as a magnetic head satisfying these needs, since the MR head can provide a high-level output without depending on a speed of the magnetic recording medium. Such an MR head includes an MR head using a single-layer film, an MR head using a spin-valve film, and an MR head using a tunnel-effect film.

Especially, the MR head using the spin-valve film utilizing a huge magnetoresistance effect has recently been popular, while the MR head using the tunnel-effect film is being brought into practical use. These MR heads include a free magnetic layer as a structure thereof. As a magnetic recording and reproducing device has come to have a mass capacity, these MR heads have been further miniaturized. In order to provide these MR heads with a still higher capability under this circumstance, technologies have soon to be established, in which technologies a magnetic domain of the above-mentioned free magnetic layer is surely regulated.

Known as one of the above-mentioned technologies is a structure of an MR head of a spin-valve type, in which a magnetic-domain regulating film is connected to each side of a spin-valve film functioning as a magnetoresistance film. FIG. 1 shows a basic structure of a conventional spin-valve-type MR head 100. It is noted that a conductor lead-out layer and an upper insulating layer described hereinafter are not shown in FIG. 1.

In this spin-valve-type MR head 100, an insulating layer 101 is formed of such a material as alumina ($Al_2O_3$) so as to form a gap. A spin-valve film 103 (a magnetoresistance film) is formed on the insulating layer 101. A magnetic-domain regulating film 106 is also formed on the insulating layer 101 so as to flank the 103. This magnetic-domain regulating film 106 is referred to as a hard film 106 since the magnetic-domain regulating film 106 is formed of a hard-magnetic material consisting of such a material as a Co-group material. An underlying layer 105 formed generally of a Cr-group material is provided between the insulating layer 101 and the hard film 106 for the purpose of improving a crystallinity of the hard film 106.

For example, the above-mentioned spin-valve-type MR head 100 can be manufactured by steps shown in FIG. 2A to FIG. 2F. The manufacturing steps shown in FIG. 2A to FIG. 2F form the above-mentioned films one by one on the insulating layer 101 by using thin-film formation technologies including sputtering and etching so as to form a desired laminated structure. It is noted that FIG. 2A to FIG. 2F show only the left side of the spin-valve film 103, because both sides of the spin-valve film 103 are symmetrical.

FIG. 2A shows a step of forming the spin-valve film 103 on the insulating layer 101 composed of alumina ($Al_2O_3$). If the spin-valve film 103 has a regular-order laminated structure, the spin-valve film 103 has a free magnetic layer, a nonmagnetic layer, a pinned magnetic layer and an antiferromagnetic layer laminated in this order from the bottom; if the spin-valve film 103 has a reverse-order laminated structure, the spin-valve film 103 has an antiferromagnetic layer, a pinned magnetic layer, a nonmagnetic layer and a free magnetic layer laminated in this order from the bottom, though not shown in the figures. Besides, an underlying layer 102 is formed under the spin-valve film 103, i.e., between the insulating layer 101 and the spin-valve film 103. This underlying layer 102 is provided case by case so as to improve a crystallinity of the spin-valve film 103.

FIG. 2B shows a step of patterning the spin-valve film 103 and the underlying layer 102. In this step, the spin-valve film 103 and the underlying layer 102 are patterned into a shape corresponding to a track width (in the crosswise direction in FIG. 2A to FIG. 2F) of a magnetic recording medium. It is noted that the underlying layer 102 is not shown in FIG. 2C to FIG. 2F.

FIG. 2C shows a step of forming the underlying layer 105 for the hard film 106 that is to be formed in the next step. FIG. 2D shows a step of forming the hard film 106 on the underlying layer 105 so that the hard film 106 contacts each end of the spin-valve film 103.

FIG. 2E shows a step of forming a conductive lead-out layer 107 on the hard film 106. The conductive lead-out layer 107 is to be used to electrically take out a magnetoresistance change in the spin-valve film 103.

Finally, FIG. 2F shows a step of forming an insulating layer 109 on the spin-valve film 103 and the conductive lead-out layer 107. The heretofore-mentioned steps shown in FIG. 2A to FIG. 2F form the conventional spin-valve-type MR head 100.

In the above-described spin-valve-type MR head 100, the underlying layer 102 is on the insulating layer 101, and the spin-valve film 103 is on the underlying layer 102; that is, the upper surface of the insulating layer 101 and the bottom surface of the underlying layer 102 are in the same plane.

However, there are two problems regarding a regulation of a magnetic domain of the above-mentioned free magnetic layer of the spin-valve film 103.

A description will be given, with reference to FIG. 1, FIG. 3A, FIG. 3B and FIG. 4, of the first problem. FIG. 3A and FIG. 3B show magnetic characteristics of the hard film 106. Specifically, FIG. 3A shows a magnetic characteristic of the hard film 106 in a territory TER-A shown in FIG. 1, and FIG. 3B shows a magnetic characteristic of the hard film 106 in a territory TER-B shown in FIG. 1.

The magnetic characteristic of the hard film 106 shown in FIG. 3A is good, marking a coercive force of 1230 Oe and a squareness ratio of 0.86, because the hard film 106 is formed on the underlying layer 105 composed of a Cr-group material provided on the insulating layer 101.

However, a part of the spin-valve film 103, the antiferromagnetic layer for example, remains under the joining part between the spin-valve film 103 and the hard film 106 in the territory TER-B. Therefore, there is a lamination, around the joint part in the territory TER-B, of the underlying layer 105 formed on the antiferromagnetic layer and the hard film 106 formed on this underlying layer 105.

Additionally, in the territory TER-B, the underlying layer 105 for the hard film 106 tends to be formed thinner than in the territory TER-A. Therefore, the underlying layer 105 does not function sufficiently in improving a crystallinity of the hard film 106. In other words, since the underlying layer 105 is formed on the spin-valve film 103 that has a predetermined crystallinity, the spin-valve film 103 puts a bad influence on the crystallinity-improvement function of the underlying layer 105.

The inventors of the present invention have confirmed that forming the underlying layer 105 on the antiferromagnetic layer of the spin-valve film 103 deteriorates the crystallinity-improvement function of the underlying layer 105. Thus, when the hard film 106 is formed on the underlying layer 105 having such a deteriorated crystallinity-improvement function, the hard film 106 naturally comes to have a deteriorated crystallinity. Accordingly, the hard film 106 comes to have a deteriorated magnetic characteristic as shown in FIG. 3B, marking a coercive force of 330 Oe and a squareness ratio of 0.80.

FIG. 4 shows, by using an X-ray diffraction, the hard film 106 having a deteriorated crystallinity. In FIG. 4, there occur not only a PEAK-1 based on the spin-valve film 103 but also a PEAK-2 based on a (001) surface of Co. This PEAK-2 indicates that there exists a crystal grain having the c-axis of Co composing the hard film 106 aligned in the direction of thickness thereof; therefore a deteriorated coercive force and a deteriorated squareness ratio can be confirmed also from FIG. 4.

The above-mentioned territory TER-B is a part at which the hard film 106 connects with the spin-valve film 103, and is important in regulating magnetic domains by applying a bias magnetic field to the free magnetic layer. However, the above-mentioned conventional spin-valve-type MR head 100 has the first problem that this connection part tends to have a deteriorated characteristic.

Further, a description will be given of the second problem of the above-mentioned spin-valve-type MR head 100. In order to further increase the output level, the spin-valve-type MR head 100 is made to have still thinner films. Therefore, the spin-valve film 103 and the free magnetic layer composing the spin-valve film 103 are made to be thinner and thinner. Accordingly, the hard film 106 formed on each side of the spin-valve film 103 is made to be thinner.

FIG. 5A is a magnified view showing a state of the spin-valve-type MR head 100 having thinner films, with the spin-valve film 103 employing the reverse-order laminated structure. FIG. 5B is a magnified view showing a state of the spin-valve-type MR head 100 having thinner films, with the spin-valve film 103 employing the regular-order laminated structure.

As the spin-valve-type MR head 100 has thinner films, the center plane of a free magnetic layer 103FR is shifted upward in the direction of thickness so as to be formed HT1 above the upper surface of the hard film 106, in the case of the reverse-order laminated structure shown in FIG. 5A. To the contrary, in the case of the regular-order laminated structure shown in FIG. 5B, the center plane of the free magnetic layer 103FR is shifted downward in the direction of thickness so as to be formed HT2 below the under surface of the hard film 106.

When the center plane of the free magnetic layer 103FR is shifted in position in the direction of thickness from the hard film 106, there occurs the second problem that the hard film 106 cannot sufficiently regulate a magnetic domain of the free magnetic layer 103FR.

In addition, with respect to the above-mentioned second problem, Japanese Laid-Open Patent Application No. 10-124823, Japanese Laid-Open Patent Application No. 10-154314 and Japanese Laid-Open Patent Application No. 2000-132817, for example, proposes a technology in which the antiferromagnetic layer of the spin-valve film is left under the hard film so as to raise the bottom of the hard film, regarding the above-described spin-valve-type MR head 100 having the spin-valve film 103 employing the reverse-order laminated structure shown in FIG. 5A.

FIG. 6A and FIG. 6B illustrate such a conventional technology of raising the bottom of the hard film. FIG. 6A illustrates a part of an MR head in which a Cr-group alloy is used as the underlying layer 105 (for the hard film) formed on the antiferromagnetic layer left as a part of the spin-valve film. FIG. 6B illustrates a part of an MR head in which a lamination of a Ta-group alloy and a Cr-group alloy is used as the underlying layer 105 formed on the antiferromagnetic layer left as a part of the spin-valve film.

Elements in FIG. 6A and FIG. 6B are referenced by the same reference marks as in FIG. 2A to FIG. 2F illustrating steps of manufacturing a conventional MR head. Additionally, with respect to the spin-valve film 103, the antiferromagnetic layer is indicated by a reference mark 103-1, and the pinned magnetic layer, the nonmagnetic layer and the free magnetic layer are collectively indicated by a reference mark 103-2. Further, in FIG. 6B, the two layers of the Ta-group alloy and the Cr-group alloy in the lamination are distinctively indicated by reference marks 105-1 and 105-2.

FIG. 7 shows a result of comparing a conventional general MR head that does not have the antiferromagnetic layer formed under the underlying layer 105 as shown in FIG. 2F, with the MR heads each having the underlying layer 105 formed on the antiferromagnetic layer 103-1 shown in FIG. 6A and FIG. 6B.

In FIG. 7, the axis of abscissas indicates a head output, and the axis of ordinates indicates a Barkhausen proportion defective. In FIG. 7, an MR head is regarded as more preferable as the head output becomes high and the Barkhausen proportion defective becomes low. Besides, criterion values in both the axis of abscissas and the axis of ordinates are 1.00, according to a plurality of tests in which data processes are performed by using the conventional general MR head. Accordingly, when the head output becomes higher than 1, the head output can be regarded as improved. Also, when the Barkhausen proportion defective becomes lower than 1, the Barkhausen proportion defective can be regarded as improved.

However, as for the MR head shown in FIG. 6A, substantially no improvement can be recognized regarding the head output, and the Barkhausen proportion defective is prone to increase, as indicated by a white square in a circle A shown in FIG. 7. Therefrom, it can be understood that a highly sensitive MR head cannot be formed simply by raising the bottom of the hard film 106 by using the antiferromagnetic layer 103-1 so as to arrange the hard film 106 at a position corresponding to the free magnetic layer.

Additionally, the hard film 106 of the MR head shown in FIG. 6A comes to have a deteriorated magnetic characteristic, as in the case shown in FIG. 3B.

FIG. 6B, as mentioned above, shows a case in which the underlying layer 105 has two layers of a generally used Cr-group underlying layer and a Ta-group underlying layer. That is, in FIG. 6B, the underlying layer 105-2 (Cr) is formed on the underlying layer 105-1 (Ta) so as to together form the underlying layer 105. As indicated by a white triangle in a circle B in FIG. 7, regarding the MR head shown in FIG. 6B, although an improvement can be recognized regarding the head output, substantially no improvement can be found regarding the Barkhausen proportion defective.

In the MR heads shown in FIG. 6A and FIG. 6B, since the antiferromagnetic layer 103-1 exists under the underlying layer 105, the hard film 106 can be effectively positioned at the same height as the free magnetic layer. However, as described above, the antiferromagnetic layer 103-1 deteriorates the crystallinity of the underlying layer 105 formed thereon. Consequently, a preferable MR head cannot be formed.

As described heretofore, when simply using the antiferromagnetic layer to raise the bottom of the hard film in an attempt to solve the above-mentioned second problem, a highly sensitive MR head still cannot be achieved due to the above-mentioned first problem.

Accordingly, the spin-valve-type MR head 100 having the above-mentioned first and second problems causes a problem that the spin-valve-type MR head 100 cannot detect a signal magnetic field from a magnetic recording medium with high sensitivity.

SUMMARY OF THE INVENTION

It is a general object of the present invention to provide an improved and useful magnetic head of a magnetoresistance type in which the above-mentioned problems are eliminated.

A more specific object of the present invention is to provide a magnetic head of a magnetoresistance type which head has a magnetic-domain regulating film possessing an excellent magnetic characteristic arranged in an optimal position.

In order to achieve the above-mentioned objects, there is provided according to one aspect of the present invention a magnetic head of a magnetoresistance type, the magnetic head comprising:
  a magnetoresistance film;
  an underlying layer formed on each of both sides of the magnetoresistance film, the underlying layer having a laminated structure of a tungsten-(W)-group metal layer formed on a tantalum-(Ta)-group metal layer; and
  a magnetic-domain regulating film formed on the underlying layer so as to regulate a magnetic domain of the magnetoresistance film.

Additionally, in the magnetic head of the magnetoresistance type according to the present invention, the laminated structure may further include a chromium-(Cr)-group metal layer formed on the tungsten-(W)-group metal layer.

Additionally, in the magnetic head of the magnetoresistance type according to the present invention, the tungsten-(W)-group metal layer may be a layer alloyed with at least one selected from a group consisting of titanium (Ti) and vanadium (V).

Additionally, in the magnetic head of the magnetoresistance type according to the present invention, the chromium-(Cr)-group metal layer may be a layer alloyed with at least one selected from a group consisting of molybdenum (Mo), vanadium (V) and tungsten (W).

Additionally, in the magnetic head of the magnetoresistance type according to the present invention, the tungsten-(W)-group metal layer may be 1.7 to 10 nm in thickness.

According to the present invention, a magnetic head of a magnetoresistance type can have a magnetic-domain regulating film having good crystal conditions and excellent magnetic characteristics.

In order to achieve the above-mentioned objects, there is also provided according to another aspect of the present invention a magnetic head of a magnetoresistance type, the magnetic head comprising:
  a magnetoresistance film;
  an underlying layer formed on each of both sides of the magnetoresistance film; and
  a magnetic-domain regulating film formed on the underlying layer so as to regulate a magnetic domain of a free magnetic layer in the magnetoresistance film,
  wherein the underlying layer is formed so thick as to arrange the magnetic-domain regulating film at a position corresponding to the free magnetic layer.

In order to achieve the above-mentioned objects, there is also provided according to another aspect of the present invention a magnetic head of a magnetoresistance type, the magnetic head comprising:
  a magnetoresistance film;
  a nonmagnetic layer formed on each of both sides of the magnetoresistance film;
  an underlying layer formed on the nonmagnetic layer; and
  a magnetic-domain regulating film formed on the underlying layer so as to regulate a magnetic domain of a free magnetic layer in the magnetoresistance film,
  wherein the nonmagnetic layer is used to arrange the magnetic-domain regulating film at a position corresponding to the free magnetic layer.

In order to achieve the above-mentioned objects, there is also provided according to another aspect of the present invention a magnetic head of a magnetoresistance type, the magnetic head comprising:
  an insulating layer;
  a magnetoresistance film formed on the insulating layer;
  an underlying layer formed on each of both sides of the magnetoresistance film; and
  a magnetic-domain regulating film formed on the underlying layer so as to regulate a magnetic domain of a free magnetic layer in the magnetoresistance film,
  wherein a part of the insulating layer under the underlying layer is formed lower than the other parts of the insulating layer so as to arrange the magnetic-domain regulating film at a position corresponding to the free magnetic layer.

In order to achieve the above-mentioned objects, there is also provided according to another aspect of the present invention a magnetic head of a magnetoresistance type, the magnetic head comprising:
  a magnetoresistance film;
  an underlying layer formed on each of both sides of the magnetoresistance film; and
  a magnetic-domain regulating film formed on the underlying layer so as to regulate a magnetic domain of a free magnetic layer in the magnetoresistance film,
  wherein a center plane of the free magnetic layer in the direction of thickness is positioned within a range from a position corresponding to a center plane of the magnetic-domain regulating film to a position higher by 25% of a thickness of the magnetic-domain regulating film.

According to the present invention, since the magnetic-domain regulating film is arranged at an optimal position corresponding to the free magnetic layer so as to regulate a magnetic domain thereof, the magnetic head of the magnetoresistance type can provide an effective magnetic-domain regulation.

Additionally, in the magnetic head of the magnetoresistance type according to the present invention, the underlying layer may preferably have a laminated structure of a tungsten-(W)-group metal layer formed on a tantalum-(Ta)-group metal layer.

Additionally, in the magnetic head of the magnetoresistance type according to the present invention, the laminated structure may preferably further include a chromium-(Cr)-group metal layer formed on the tungsten-(W)-group metal layer.

According to the present invention, the magnetic-domain regulating film arranged at an optimal position can have excellent magnetic characteristics; therefore, the magnetic head of the magnetoresistance type can provide a more effective magnetic-domain regulation.

In order to achieve the above-mentioned objects, there is also provided according to another aspect of the present invention a magnetic head of a magnetoresistance type, the magnetic head comprising:
 a first underlying layer;
 a magnetoresistance film formed on the first underlying layer;
 a second underlying layer formed on each of both sides of the magnetoresistance film; and
 a magnetic-domain regulating film formed on the second underlying layer so as to regulate a magnetic domain of a free magnetic layer in the magnetoresistance film,
 wherein the first underlying layer and the second underlying layer are so formed as to arrange the magnetic-domain regulating film at a position corresponding to the free magnetic layer.

Additionally, the magnetic head of the magnetoresistance type according to the present invention may further comprise a nonmagnetic layer formed between the first underlying layer and the second underlying layer so as to be used to arrange the magnetic-domain regulating film at the position corresponding to the free magnetic layer.

According to the present invention, since the magnetic-domain regulating film is arranged at an optimal position corresponding to the free magnetic layer so as to regulate a magnetic domain thereof, the magnetic head of the magnetoresistance type can provide an effective magnetic-domain regulation.

Additionally, in the magnetic head of the magnetoresistance type according to the present invention, the second underlying layer may have a laminated structure of a tungsten-(W)-group metal layer formed on a tantalum-(Ta)-group metal layer.

Additionally, in the magnetic head of the magnetoresistance type according to the present invention, the tungsten-(W)-group metal layer may be a layer alloyed with at least one selected from a group consisting of titanium (Ti) and vanadium (V).

Additionally, in the magnetic head of the magnetoresistance type according to the present invention, the laminated structure may further include a chromium-(Cr)-group metal layer formed on the tungsten-(W)-group metal layer.

According to the present invention, the magnetic-domain regulating film arranged at an optimal position can have excellent magnetic characteristics; therefore, the magnetic head of the magnetoresistance type can provide a more effective magnetic-domain regulation.

In order to achieve the above-mentioned objects, there is also provided according to another aspect of the present invention a magnetic head of a magnetoresistance type, the magnetic head comprising:
 a magnetoresistance film detecting a magnetic field;
 a residual film formed of a part of a layer composing the magnetoresistance film left on each of both sides thereof;
 an underlying layer formed on the residual film, the underlying layer having a laminated structure of a tungsten-(W)-group metal layer formed on a tantalum-(Ta)-group metal layer; and
 a magnetic-domain regulating film formed on the underlying layer so as to regulate a magnetic domain of a free magnetic layer in the magnetoresistance film.

According to the present invention, by using a part of a layer composing the magnetoresistance film, the magnetic-domain regulating film can be arranged at an optimal position corresponding to the free magnetic layer so as to regulate a magnetic domain thereof. Therefore, the magnetic head according to the present invention can provide an effective magnetic-domain regulation.

Additionally, in the magnetic head of the magnetoresistance type according to the present invention, the laminated structure may further include a chromium-(Cr)-group metal layer formed on the tungsten-(W)-group metal layer.

Additionally, in the magnetic head of the magnetoresistance type according to the present invention, the tungsten-(W)-group metal layer may be a layer alloyed with at least one selected from a group consisting of titanium (Ti) and vanadium (V).

According to the present invention, a magnetic head of a magnetoresistance type can have a magnetic-domain regulating film having good crystal conditions and excellent magnetic characteristics.

Additionally, in the magnetic head of the magnetoresistance type according to the present invention, the magnetoresistance film may be a spin-valve film having a reverse-order laminated structure, and the residual film may be an antiferromagnetic layer of the spin-valve film.

According to the present invention, the antiferromagnetic layer of the spin-valve film can be efficiently used to raise the bottom of the hard film.

In order to achieve the above-mentioned objects, there is also provided according to another aspect of the present invention a magnetic reproducing device for reproducing magnetic information from a magnetic recording medium, the device comprising:
 a magnetic head of a magnetoresistance type, the magnetic head including:
 a magnetoresistance film;
 an underlying layer formed on each of both sides of the magnetoresistance film, the underlying layer having a laminated structure of a tungsten-(W)-group metal layer formed on a tantalum-(Ta)-group metal layer; and
 a magnetic-domain regulating film formed on the underlying layer so as to regulate a magnetic domain of the magnetoresistance film.

In order to achieve the above-mentioned objects, there is also provided according to another aspect of the present invention a magnetic reproducing device for reproducing magnetic information from a magnetic recording medium, the device comprising:
 a magnetic head of a magnetoresistance type, the magnetic head including:

a magnetoresistance film;

an underlying layer formed on each of both sides of the magnetoresistance film; and a magnetic-domain regulating film formed on the underlying layer so as to regulate a magnetic domain of a free magnetic layer in the magnetoresistance film, wherein the underlying layer is formed so thick as to arrange the magnetic-domain regulating film at a position corresponding to the free magnetic layer.

According to the present invention, the magnetic reproducing device can reproduce magnetic information with high sensitivity.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

In embodiments of the present invention to solve the above-mentioned first problem, an underlying layer, which is provided so as to improve a crystal orientation of a magnetic-domain regulating film (hereinafter referred to as a hard film), has a laminated structure of layers having different functions. The embodiments preferable for solving the first problem are shown in FIG. 8A to FIG. 9C.

It is noted that, in the following embodiments, in order to distinguish from a first underlying layer provided under a magnetoresistance film, a second underlying layer provided so as to improve a crystal orientation of the hard film is especially referred to as a hard-film underlying layer.

Figure 8A:
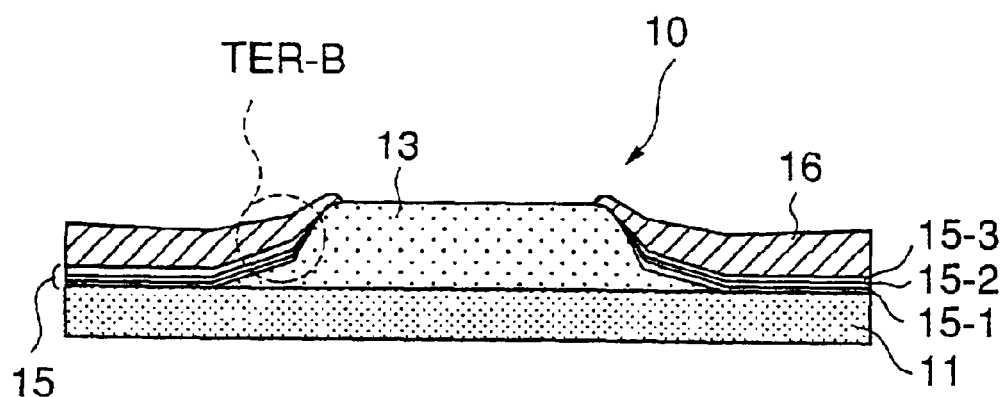
FIG. 8A shows a main structure of a magnetic head (an MR head) of a magnetoresistance type according to a first embodiment of the present invention.
Figure 8B:
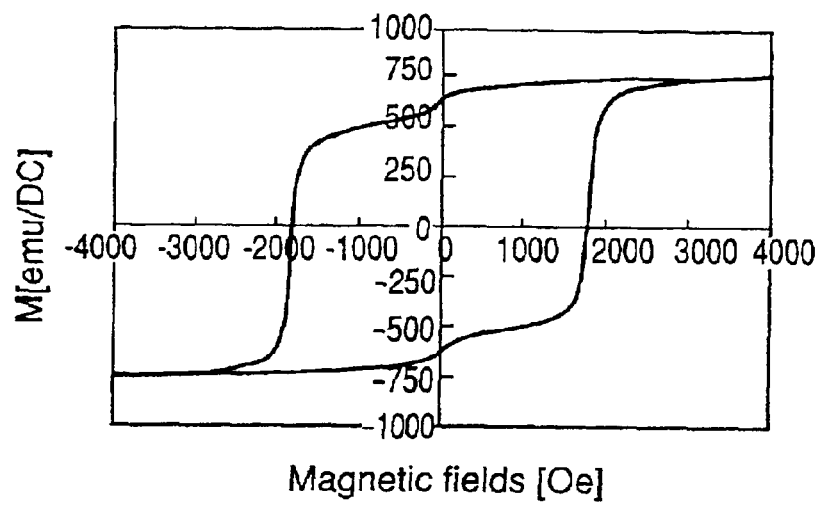
FIG. 8B shows a magnetic characteristic of a hard film in a territory TER-B shown in FIG. 8A.
Figure 8C:
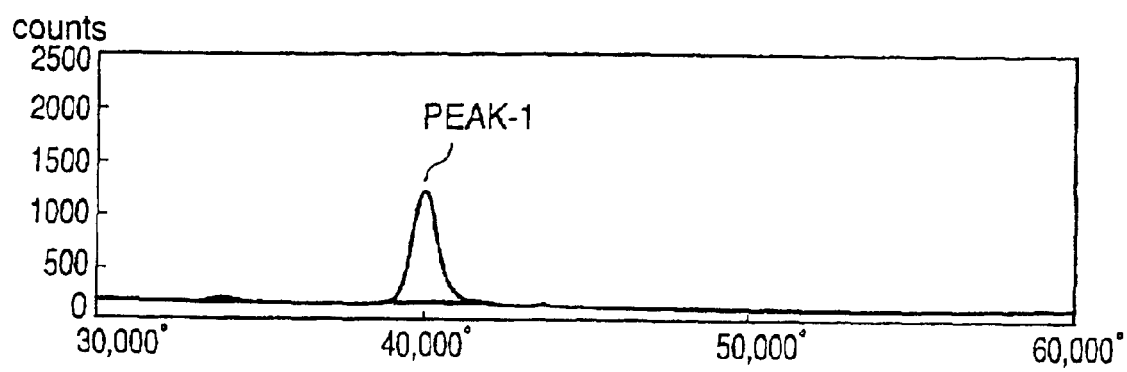
FIG. 8C is an X-ray diffraction graph of the hard film in the territory TER-B shown in FIG. 8A.

FIG. 8A to FIG. 8C are drawings regarding a magnetic head 10 of a magnetoresistance type (hereinafter simply referred to as an MR head 10) according to a first embodiment of the present invention. FIG. 8A shows a main structure of the MR head 10. FIG. 8B shows a magnetic characteristic of a hard film in a territory TER-B where a magnetoresistance film and the hard film join each other in FIG. 8A. FIG. 8C is an X-ray diffraction graph of the hard film in the territory TER-B.

The MR head 10 according to the first embodiment has a magnetoresistance film 13. A hard film (a magnetic-domain regulating film) 16 is formed on a hard-film underlying layer 15 and the magnetoresistance film 13 and is joined to each side of the magnetoresistance film 13. The magnetoresistance film 13 and the hard-film underlying layer 15 are formed on an insulating layer 11 provided so as to form a gap.

The hard-film underlying layer 15 according to the present embodiment has a laminated structure of metal layers having different functions. For example, the hard-film underlying layer 15 has a structure in which a tantalum-(Ta)-group metal layer 15-1, a tungsten-(W)-group metal layer 15-2 and a chromium-(Cr)-group metal layer 15-3 are laminated in this order from the bottom.

The tantalum-(Ta)-group metal layer 15-1 has a function to disrupt crystal structures in the territory TER-B where the tantalum-(Ta)-group metal layer 15-1 joins the magnetoresistance film 13. That is, the tantalum-(Ta)-group metal layer 15-1 resets an influence that the magnetoresistance film 13 under the hard-film underlying layer 15 puts on crystals, which is a problem in a conventional MR head.

The tungsten-(W)-group metal layer 15-2 or the chromium-(Cr)-group metal layer 15-3 improves a crystal orientation of the hard film 16. The tungsten-(W)-group metal layer 15-2 may have a function to make crystals of layers formed thereon uniform so as to fix a crystal orientation thereof. The chromium-(Cr)-group metal layer 15-3 may have a function to fine-tune intervals between lattices of layers formed thereon.

Furthermore, other metals or nonmetals may be added to the tantalum-(Ta)-group metal layer 15-1 for the purpose of improving a magnetic characteristic, a corrosion resistivity and a heat resistivity of the hard film 16. Also, other metals or nonmetals may be added to the tungsten-(W)-group metal layer 15-2 and the chromium-(Cr)-group metal layer 15-3 for the purpose of improving an electrical conductivity thereof, securing coordination with the crystal lattices of the hard film 16, or improving a magnetic characteristic, a corrosion resistivity and a heat resistivity. For example, adding at least one of titanium (Ti) and vanadium (V) to tungsten can improve the electrical conductivity. The above-mentioned tungsten-(W)-group metal layer 15-2 is preferably formed 1.7 to 10 nm in thickness.

Additionally, at least one selected from molybdenum (Mo), vanadium (V) and tungsten (W) may be added to the chromium-(Cr)-group metal layer 15-3. In this case, crystal lattice intervals of the chromium-(Cr)-group metal layer 15-3 can be altered and thereby fine-tuned so that a crystal coordination with the hard film 16 can be improved; thereby a magnetic characteristic of the hard film 16 can be improved.

Besides, a lamination film such as a spin-valve film or a single-layer film can be employed as the above-mentioned magnetoresistance film 13. The present embodiment employs a spin-valve film having a lamination with an antiferromagnetic layer being at the bottom. Thus, in the territory TER-B of the MR head 10, the hard-film underlying layer 15 and the hard film 16 are formed on the antiferromagnetic layer.

To be more specific in this respect, the present embodiment employs a spin-valve film having the reverse-order laminated structure with the antiferromagnetic layer being at the bottom. An underlying layer of NiFe is provided under this spin-valve film for the purpose of improving a crystallinity thereof. Therefore, in the territory TER-B in FIG. 8A, the NiFe, the antiferromagnetic layer (PdPtMn), the hard-film underlying layer 15 and the hard film 16 are laminated in this order from the bottom.

The hard-film underlying layer 15 has a laminated structure of Ta (3 nm), W (3 nm) and Cr (3 nm), and CoCrPt is employed as the hard film 16.

FIG. 8B shows a magnetic characteristic of the hard film 16 in the junction territory TER-B of the MR head 10 having the above-described specific structure, and FIG. 8C shows a structure thereof by using an X-ray diffraction.

According to FIG. 8B, a good magnetic characteristic can be confirmed, with the coercive force being 1760 Oe and the squareness ratio being 0.84, though in the territory TER-B. In FIG. 8C, a PEAK-2 due to Co of the hard film (CoCrPt) 16 is not observed, unlike the hard film 106 in the conventional MR head 100, so it can be confirmed that a crystal orientation of the hard film 16 is well aligned in the in-plane direction.

As described above, in the MR head 10 according to the first embodiment, since the hard-film underlying layer 15 has the lamination structure of the tantalum-(Ta)-group metal layer 15-1, the tungsten-(W)-group metal layer 15-2 and the chromium-(Cr)-group metal layer 15-3 laminated in this order, the hard film 16 having a good crystal orientation and an excellent magnetic property can be formed. The hard film 16 like this can realize a sure magnetic-domain regulation of the magnetoresistance film 13.

Figure 9A:
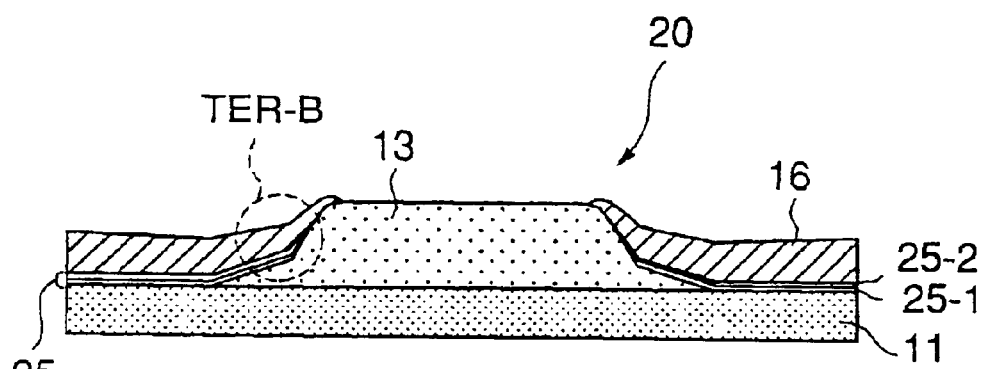
FIG. 9A shows a main structure of an MR head according to a second embodiment of the present invention.
Figure 9B:
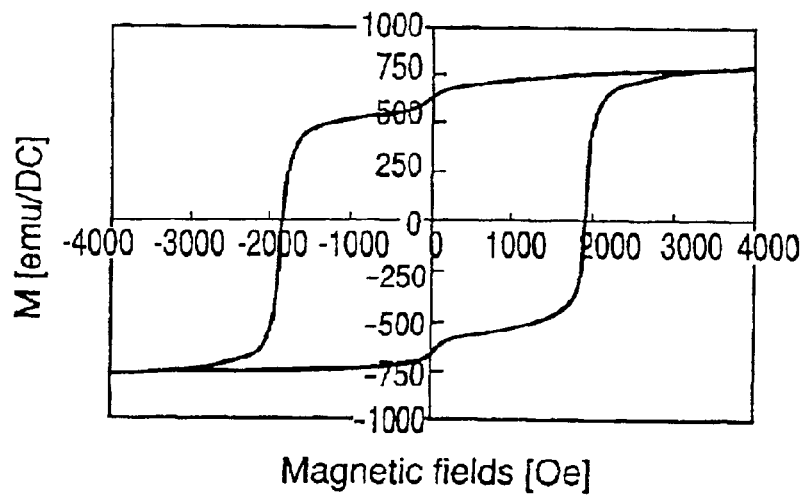
FIG. 9B shows a magnetic characteristic of a hard film in a territory TER-B shown in FIG. 9A.
Figure 9C:
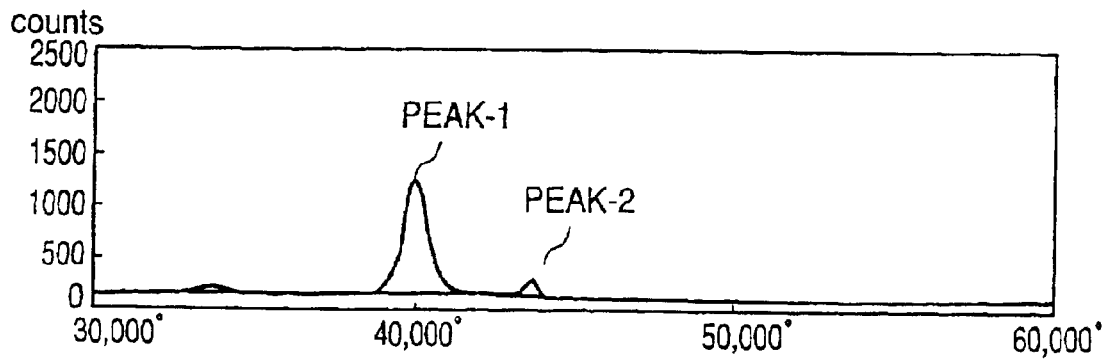
FIG. 9C is an X-ray diffraction graph of the hard film in the territory TER-B shown in FIG. 9A.

FIG. 9A to FIG. 9C are drawings regarding an MR head 20 according to a second embodiment of the present invention. FIG. 9A shows a main structure of the MR head 20. FIG. 9B shows a magnetic characteristic of a hard film in a territory TER-B where a magnetoresistance film and the hard film join each other in FIG. 9A. FIG. 9C is an X-ray diffraction graph of the hard film in the territory TER-B. It is noted that elements in FIG. 9A that are identical or equivalent to the elements shown in FIG. 8A are referenced by the same reference marks.

A hard-film underlying layer 25 of the MR head 20 according to the present embodiment has a laminated structure of two layers having different functions. Specifically, in the laminated structure, a tantalum-(Ta)-group metal layer 25-1 and a tungsten-(W)-group metal layer 25-2 are laminated on the insulating layer 11 in this order from the bottom. By having the tantalum-(Ta)-group metal layer 25-1, the hard-film underlying layer 25 disrupts crystal structures in the territory TER-B where the hard-film underlying layer 25 joins the magnetoresistance film 13.

The tungsten-(W)-group metal layer 25-2 is an alloy of $W_{95at\%}Ti_{5at\%}$ containing titanium. This tungsten-(W)-group metal layer 25-2 improves a crystal orientation of the hard film 16.

The MR head 20 according to the present embodiment is manufactured in the same manner as the MR head 10 according to the first embodiment, except that Ta (1 nm) and $W_{95at\%}Ti_{5at\%}$ (3 nm) are used as the hard-film underlying layer 25 (the tantalum-(Ta)-group metal layer 25-1 and the tungsten-(W)-group metal layer 25-2, respectively). FIG. 9B shows a magnetic characteristic of the hard film 16 in the junction territory TER-B of the MR head 20, and FIG. 9C shows a structure thereof by using an X-ray diffraction.

According to FIG. 9B, a good magnetic characteristic can be confirmed, with the coercive force being 1880 Oe and the squareness ratio being 0.84, though in the territory TER-B. In FIG. 9C, although a PEAK-2 due to the hard film (CoCrPt) 16 is barely observed, this hardly causes a problem.

Additionally, the tantalum-(Ta)-group metal layer 25-1 also may be made of materials to which other metals or nonmetals are added for the purpose of improving a magnetic characteristic, a corrosion resistivity and a heat resistivity of the hard film 16. Also, the tungsten-(W)-group metal layer 25-2 may be made of materials to which other metals or nonmetals are added for the purpose of improving an electrical conductivity thereof, securing coordination with the crystal lattices of the hard film 16, or improving a magnetic characteristic, a corrosion resistivity and a heat resistivity. For example, adding vanadium (V), besides titanium (Ti) mentioned above, to tungsten can improve the electrical conductivity.

Although the second embodiment does not use a chromium-(Cr)-group metal layer, a chromium-(Cr)-group metal layer may be provided further on the tungsten-(W)-group metal layer 25-2. Providing a chromium-(Cr)-group metal layer further improves crystal conditions of the hard film 16 so that the PEAK-2 in FIG. 9C may disappear. At least one of molybdenum (Mo), vanadium (V) and tungsten (W) may be added to the chromium-(Cr)-group metal layer.

In the MR head 20 according to the second embodiment, since the hard-film underlying layer 25 has the lamination structure in which at least the tantalum-(Ta)-group metal layer 25-1 and the tungsten-(W)-group metal layer 25-2 are laminated in this order, the hard film 16 having a good crystal orientation and an excellent magnetic property can be formed. The hard film 16 like this can realize a sure magnetic-domain regulation of the magnetoresistance film 13.

Next, descriptions will be given of embodiments of the present invention for solving the above-mentioned second problem, each setting forth an MR head having a hard film arranged at a position corresponding to a free magnetic layer in a magnetoresistance film so as to provide a sure magnetic-domain regulation for the free magnetic layer. The embodiments preferable for solving the second problem are shown in FIG. 10A to FIG. 21.

It is noted that the following embodiments employ a spin-valve film as a magnetoresistance film, and set forth a plurality of modes to realize a magnetic-domain regulation of a free magnetic layer 43FR in the spin-valve film.

As described above, the spin-valve film has either a regular-order laminated structure or a reverse-order laminated structure. The position of a hard film tends to be shifted upward in the direction of thickness with respect to the free magnetic layer of the spin-valve film having the regular-order laminated structure. To the contrary, the position of a hard film tends to be shifted downward in the direction of thickness with respect to the free magnetic layer of the spin-valve film having the reverse-order laminated structure. Therefore, the regular-order laminated structure and the reverse-order laminated structure require different measures to arrange the hard film at a position corresponding to the free magnetic layer.

Third to sixth embodiments described hereinafter each set forth an MR head including the spin-valve film of the reverse-order laminated structure, a seventh embodiment sets forth an MR head including the spin-valve film of the regular-order laminated structure.

In the third embodiment of the present invention, a hard-film underlying layer is formed so thick as to shift the position of a hard film upward to an optimal position corresponding to a free magnetic layer 43FR.

Figure 10A:
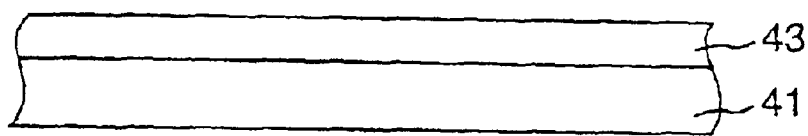
FIG. 10A to FIG. 10F show manufacturing steps in sequence of an MR head according to a third embodiment of the present invention.
Figure 10B:
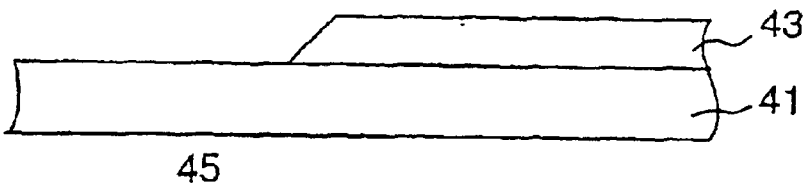
Figure 10C:
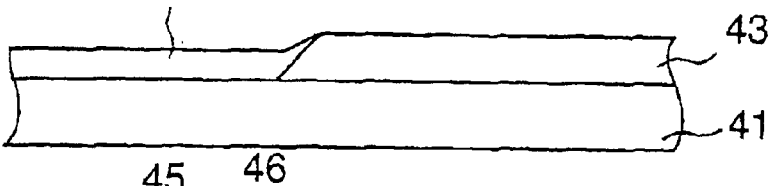
Figure 10D:
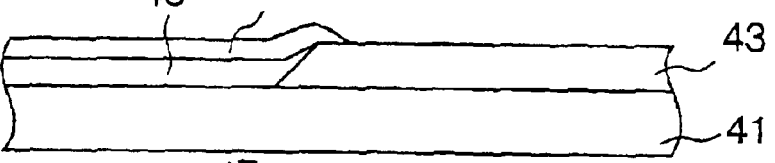
Figure 10E:
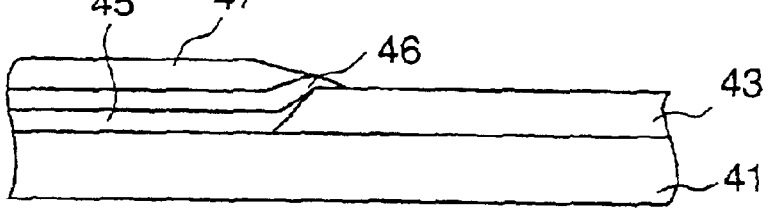
Figure 10F:
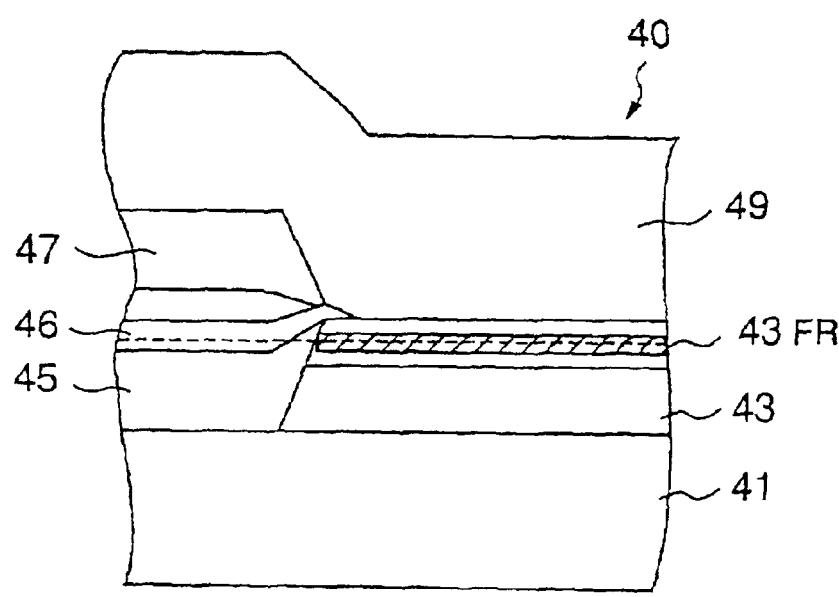

FIG. 10A to FIG. 10F are drawings regarding an MR head 40 according to the third embodiment of the present invention. FIG. 10A to FIG. 10F show manufacturing steps of the MR head 40 in sequence, and FIG. 10F shows an outline of a structure of the MR head 40 in the final form. These manufacturing steps form films one by one on an insulating layer 41 by using thin-film formation technologies including sputtering and etching so as to form a desired laminated structure. It is noted that FIG. 10A to FIG. 10F show only the left side of a spin-valve film (a magnetoresistance film) 43, because both sides of the spin-valve film 43 are symmetrical.

FIG. 10A shows a step of forming the spin-valve film 43 on the insulating layer 41 composed of alumina ($Al_2O_3$), for example. The spin-valve film 43 has a reverse-order laminated structure in which an antiferromagnetic layer, a pinned magnetic layer, a nonmagnetic layer and a free magnetic layer 43FR are laminated in this order from the bottom, though not shown in the figures.

FIG. 10B shows a step of patterning the spin-valve film 43. In this step, the spin-valve film 43 is patterned into a shape corresponding to a track width (in the crosswise direction in FIG. 10A to FIG. 10F) of a magnetic recording medium.

FIG. 10C shows a step of forming a hard-film underlying layer 45. The hard-film underlying layer 45 formed in this step has its intrinsic function of improving a crystallinity of a hard-film 46 that is to be formed thereon and a function of adjusting the position of the hard film 46 in the direction of thickness so as to arrange the hard film 46 at a position corresponding to the free magnetic layer 43FR of the spin-valve film 43. That is, the hard-film underlying layer 45 according to the present embodiment not only has its intrinsic function, but also is formed so thick as to raise the bottom of the hard film 46 and thus to arrange the hard film 46 at a position corresponding to the free magnetic layer 43FR of the spin-valve film 43. Whereas the conventional hard-film underlying layer is approximately 2 to 3 nm in thickness, the hard-film underlying layer 45 according to the present embodiment is, for example, 12 to 13 nm in thickness, which is thicker than the conventional hard-film underlying layer.

FIG. 10D shows a step of forming the hard film 46 on the hard-film underlying layer 45 so that the hard film 46 contacts each end of the spin-valve film 43. As mentioned above, the hard film 46 is arranged at a position corresponding to the free magnetic layer 43FR of the spin-valve film 43.

FIG. 10E shows a step of forming a conductive lead-out layer 47 on the hard film 46. The conductive lead-out layer 47 is to be used to electrically take out a magnetoresistance change in the spin-valve film 43.

Finally, FIG. 10F shows a step of forming an insulating layer 49 on the spin-valve film 43 and the conductive lead-out layer 47. The heretofore-mentioned steps shown in FIG. 10A to FIG. 10F form the MR head 40 according to the present embodiment.

In the MR head 40 according to the present embodiment, the hard film 46 is arranged at the same height position as the free magnetic layer 43FR of the spin-valve film 43. Therefore, in the MR head 40, the hard film 46 surely regulates a magnetic domain of the free magnetic layer 43FR.

Further, improving crystal conditions of the hard film 46 arranged at such a preferable position can provide a surer magnetic-domain regulation of the free magnetic layer 43FR. That is, applying the hard-film underlying layer described in the first or second embodiment improving a crystallinity of the hard film to the MR head 40 according to the present third embodiment makes the MR head 40 more preferable.

Specifically, a laminated structure of at least a tungsten-(W)-group metal layer formed on a tantalum-(Ta)-group metal layer, and preferably a laminated structure of at least a chromium-(Cr)-group metal layer formed further on the above tungsten-(W)-group metal layer, can be employed as the hard-film underlying layer 45 of the MR head 40. The MR head 40 like this can realize an optimal magnetic-domain regulation of the free magnetic layer 43FR since the hard film 46 having an excellent magnetic characteristic is arranged at an optimal position.

Next, a description will be given of the fourth embodiment of the present invention. In the fourth embodiment of the present invention, a nonmagnetic layer is added under a hard-film underlying layer so as to adjust the position of a hard film. Forming this nonmagnetic layer shifts the position of the hard film upward to an optimal position corresponding to a free magnetic layer 43FR.

Figure 11A:
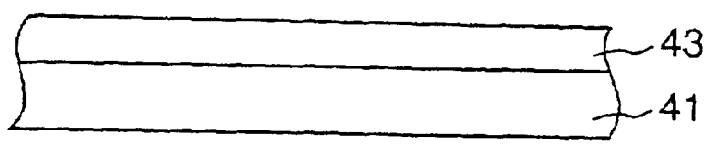
FIG. 11A to FIG. 11G show manufacturing steps in sequence of an MR head according to a fourth embodiment of the present invention.
Figure 11B:
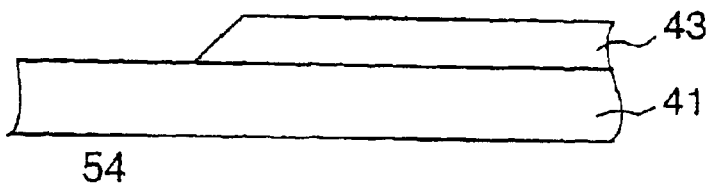
Figure 11C:
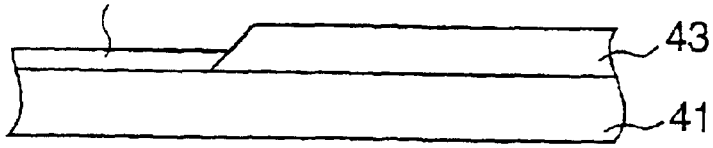
Figure 11D:
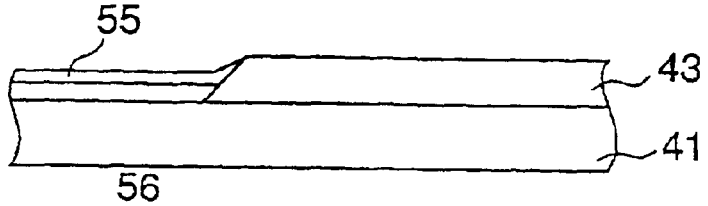
Figure 11E:
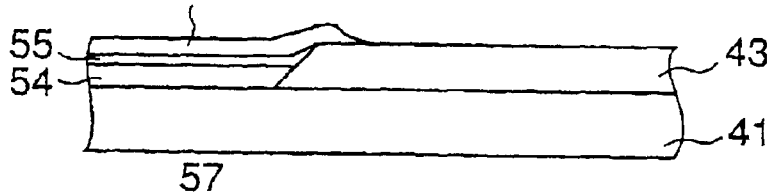
Figure 11F:
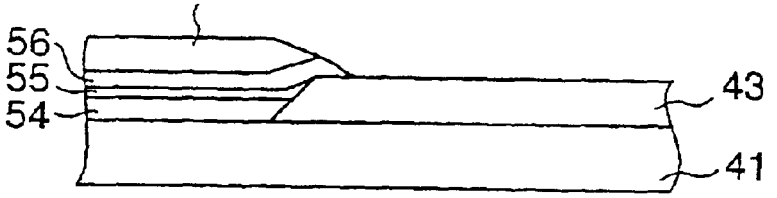
Figure 11G:
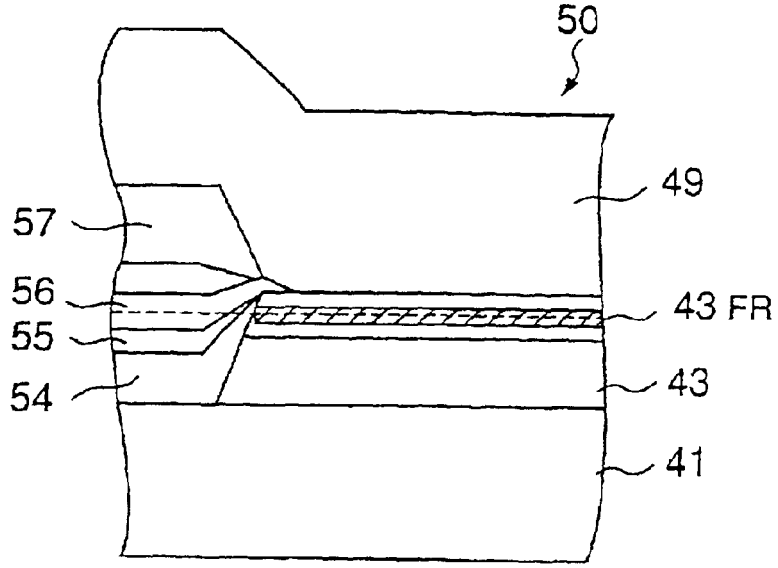

FIG. 11A to FIG. 11G are drawings regarding an MR head 50 according to the fourth embodiment of the present invention. FIG. 11A to FIG. 11G show manufacturing steps of the MR head 50 in sequence, and FIG. 11G shows an outline of a structure of the MR head 50 in the final form. Since the manufacturing steps shown in FIG. 11A to FIG. 11G are similar or analogous to the manufacturing steps shown in FIG. 10A to FIG. 10F, elements in FIG. 11A to FIG. 11G that are identical or equivalent to the elements shown in FIG. 10A to FIG. 10F are referenced by the same reference marks, and will not be described in duplication; but mainly, different elements will be described.

Steps shown in FIG. 11A and FIG. 11B are identical to the steps shown in FIG. 10A to FIG. 10B. Subsequently, FIG. 11C shows a step of forming a nonmagnetic layer 54 for the position adjustment. Whereas the above-mentioned third embodiment adjusts the height position of a hard film by forming the hard-film underlying layer thick, the present fourth embodiment adjusts the height position of a hard film by adding the nonmagnetic layer 54. The nonmagnetic layer 54 may be formed of any material that does not deteriorate crystallinities or magnetic characteristics of a hard-film underlying layer 55 and a hard film 56 to be formed thereon.

FIG. 11D shows a step of forming the hard-film underlying layer 55. The hard-film underlying layer 55 is so formed in this step that the bottom thereof is raised by the nonmagnetic layer 54. Therefore, the hard film 56, which is to be formed on this hard-film underlying layer 55, can be arranged at a position corresponding to the free magnetic layer 43FR of the spin-valve film 43.

FIG. 11E shows a step of forming the hard film 56 on the hard-film underlying layer 55 so that the hard film 56 contacts each end of the spin-valve film 43. As mentioned above, the hard film 56 is arranged at a position corresponding to the free magnetic layer 43FR of the spin-valve film 43.

FIG. 11F shows a step of forming a conductive lead-out layer 57 on the hard film 56. The conductive lead-out layer 57 is to be used to electrically take out a magnetoresistance change in the spin-valve film 43. Finally, FIG. 11G shows a step of forming the insulating layer 49 on the spin-valve film 43 and the conductive lead-out layer 57. The heretofore-mentioned steps shown in FIG. 11A to FIG. 11G form the MR head 50 according to the present embodiment.

In the MR head 50 according to the present embodiment, the hard film 56 is arranged at the position corresponding to the free magnetic layer 43FR of the spin-valve film 43. Therefore, in the MR head 50, the hard film 56 effectively regulates a magnetic domain of the free magnetic layer 43FR.

Further, applying the hard-film underlying layer described in the first or second embodiment improving a crystallinity of the hard film to the MR head 50 according to the present fourth embodiment makes the MR head 50 more preferable.

Next, a description will be given of the fifth embodiment of the present invention. In the fifth embodiment of the present invention, an underlying layer (a first underlying layer) formed under a spin-valve film is left under a hard-film underlying layer (a second underlying layer) so as to be used to adjust the position of a hard film. The present fifth embodiment uses this first underlying layer to shift the position of the hard film upward to a position corresponding to a free magnetic layer 43FR.

Figure 12A:
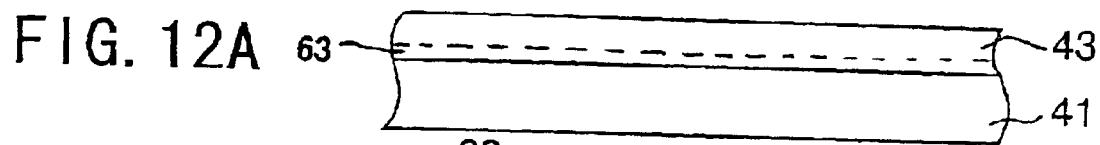
FIG. 12A to FIG. 12F show manufacturing steps in sequence of an MR head according to a fifth embodiment of the present invention.
Figure 12B:
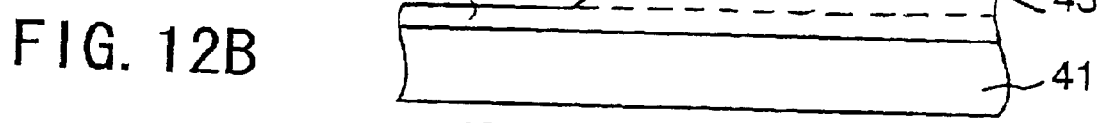
Figure 12C:
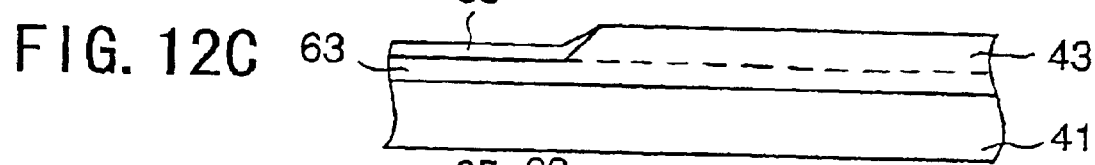
Figure 12D:
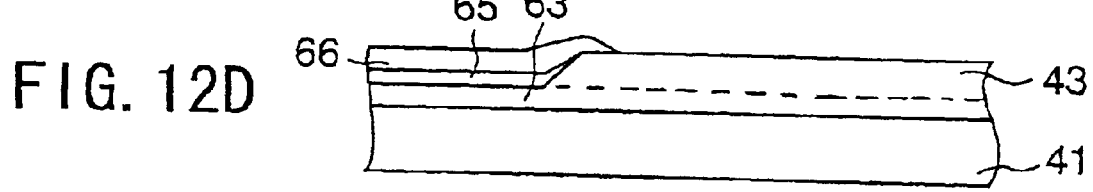
Figure 12E:
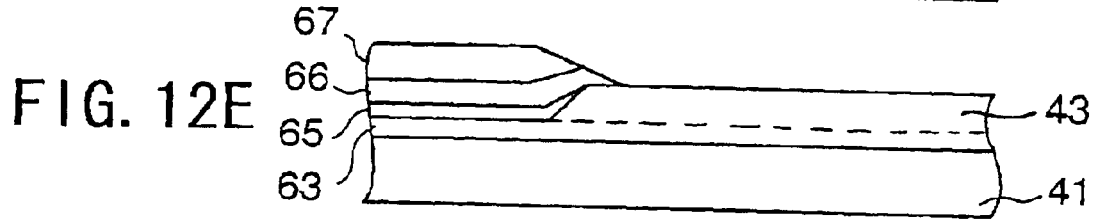
Figure 12F:
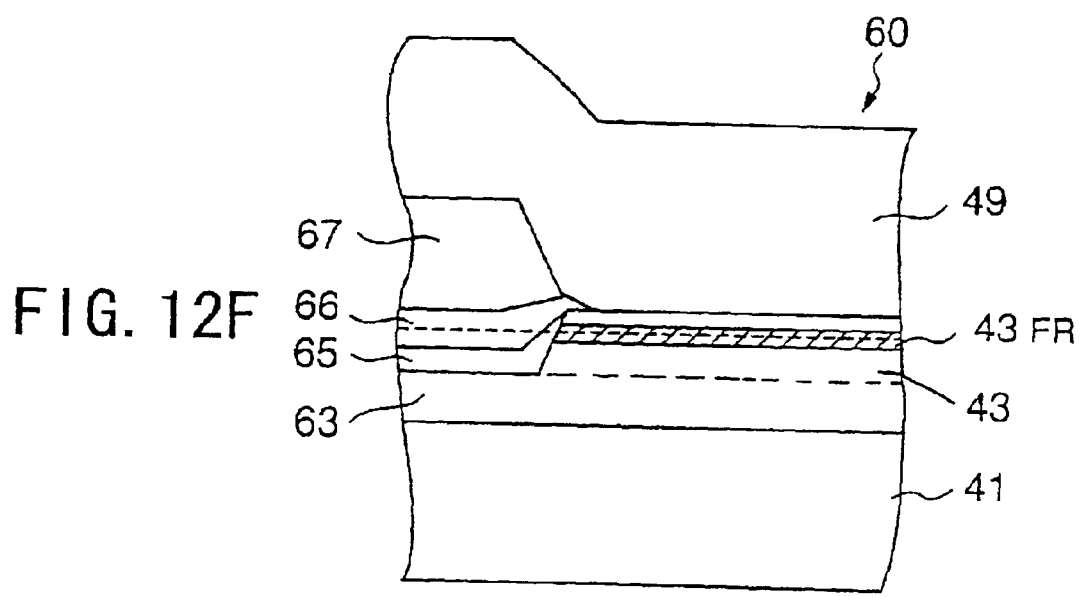

FIG. 12A to FIG. 12F are drawings regarding an MR head 60 according to the fifth embodiment of the present invention. FIG. 12A to FIG. 12F show manufacturing steps of the MR head 60 in sequence, and FIG. 12F shows an outline of a structure of the MR head 60 in the final form. Since the manufacturing steps shown in FIG. 12A to FIG. 12F are also similar or analogous to the manufacturing steps shown in FIG. 10A to FIG. 10F, elements in FIG. 12A to FIG. 12F that are identical or equivalent to the elements shown in FIG. 10A to FIG. 10F are referenced by the same reference marks, and will not be described in duplication; but mainly, different elements will be described.

A step shown in FIG. 12A is substantially identical to the step shown in FIG. 10A. It is noted that, in this step, an underlying layer (a first underlying layer) 63 is formed under the spin-valve film 43, i.e., between the insulating layer 41 and the spin-valve film 43. In a step of patterning the spin-valve film 43 shown in FIG. 12B, the spin-valve film 43 is so patterned that the underlying layer 63 is left on the insulating layer 41. It is noted that, in some cases, such an underlying layer as the underlying layer 63 is provided so as to improve a crystallinity of a spin-valve film. In the present embodiment, this underlying layer is left on the insulating layer so as to be used to adjust the position of a hard film.

FIG. 12C shows a step of forming a hard-film underlying layer (a second underlying layer) 65. The hard-film underlying layer 65 is so formed in this step that the bottom thereof is raised by the above-mentioned underlying layer 63 for the spin-valve film. Therefore, a hard film 66, which is to be formed on this hard-film underlying layer 65, can be arranged at a position corresponding to the free magnetic layer 43FR of the spin-valve film 43.

In a case that the underlying layer 63 does not have a sufficient thickness, the hard-film underlying layer 65 may be formed so thick as to adjust the position, as in the above-described third embodiment. Alternatively, a nonmagnetic layer for the position adjustment may be added between the underlying layer 63 and the hard-film underlying layer 65, as in the above-described fourth embodiment.

FIG. 12D shows a step of forming the hard film 66 on the hard-film underlying layer 65 so that the hard film 66 contacts each end of the spin-valve film 43. As mentioned above, the hard film 66 is arranged at a position corresponding to the free magnetic layer 43FR of the spin-valve film 43.

FIG. 12E shows a step of forming a conductive lead-out layer 67 on the hard film 66. The conductive lead-out layer 67 is to be used to electrically take out a magnetoresistance change in the spin-valve film 43. Finally, FIG. 12F shows a step of forming the insulating layer 49 on the spin-valve film 43 and the conductive lead-out layer 67. The heretofore-mentioned steps shown in FIG. 12A to FIG. 12F form the MR head 60 according to the present embodiment.

In the MR head 60 according to the present embodiment, the hard film 66 is arranged at the position corresponding to the free magnetic layer 43FR of the spin-valve film 43. Therefore, in the MR head 60, the hard film 66 effectively regulates a magnetic domain of the free magnetic layer 43FR.

Further, applying the hard-film underlying layer described in the first or second embodiment improving a crystallinity of the hard film to the MR head 60 according to the present fifth embodiment makes the MR head 60 more preferable.

Further, a description will be given of a specific example of the MR head 60 shown in FIG. 12A to FIG. 12F according to the present fifth embodiment.

Figure 13:
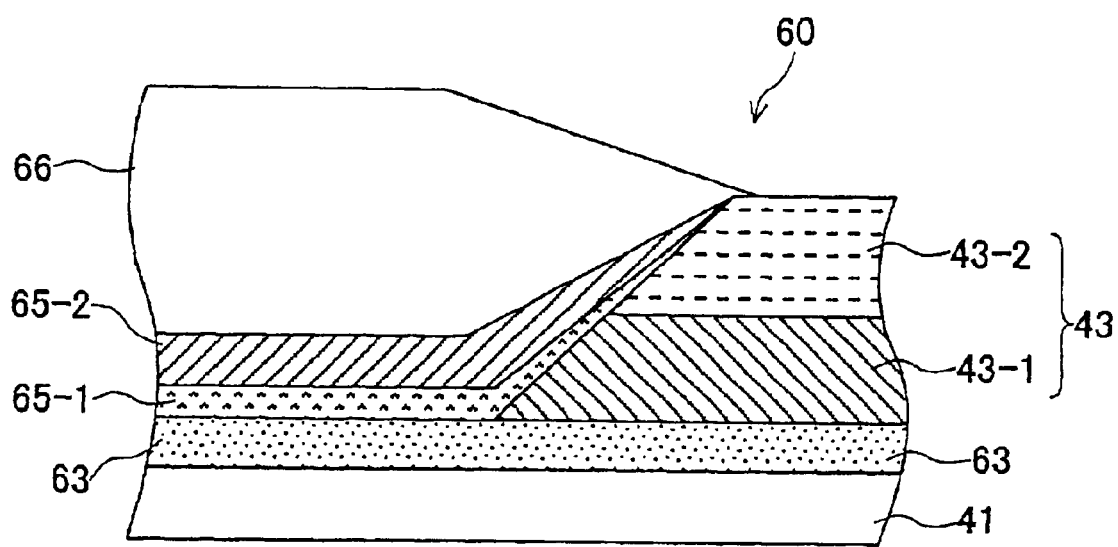
FIG. 13 is a magnified view of the vicinity of a joint of a spin-valve film and a hard film regarding the MR head shown in FIG. 12A to FIG. 12F.
Figure 14:
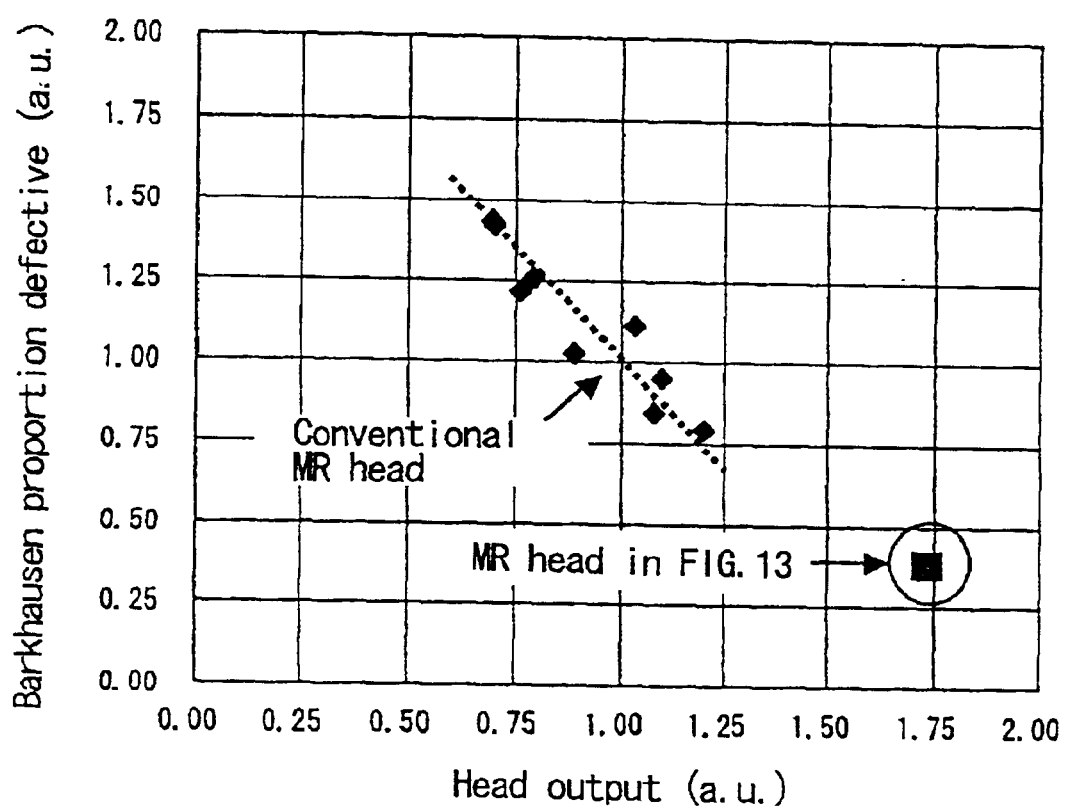
FIG. 14 shows a relationship between a head output and a Barkhausen proportion defective of the MR head shown in FIG. 13.
Figure 15:
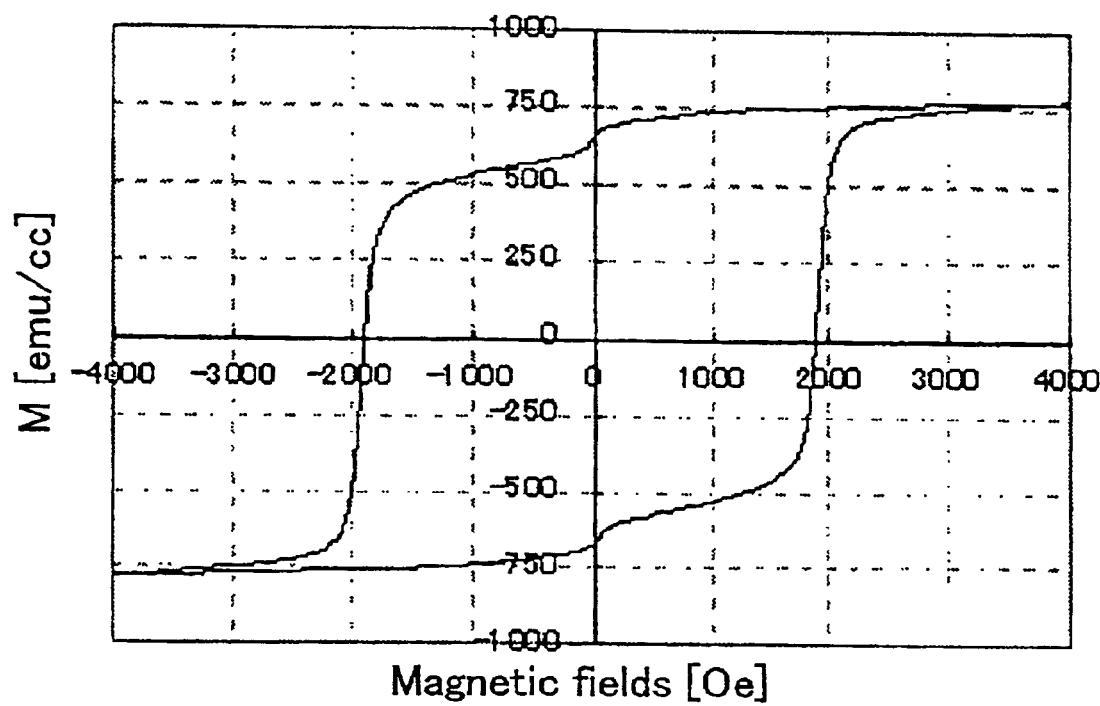
FIG. 15 shows a magnetic characteristic of the hard film of the MR head shown in FIG. 13.

FIG. 13 to FIG. 15 are drawings regarding the MR head 60 in a case of using a lamination of a tantalum-(Ta)-group metal layer 65-1 and a tungsten-(W)-group metal layer 65-2 as the hard-film underlying layer 65, as in the second embodiment. In the lamination, the tantalum-(Ta)-group metal layer 65-1 and the tungsten-(W)-group metal layer 65-2 are laminated in this order from the bottom.

FIG. 13 is a magnified view of the vicinity of a joint of the spin-valve film 43 and the hard film 66 of the MR head 60. This spin-valve film 43 has the above-described reverse-order laminated structure. The antiferromagnetic layer is indicated by a reference mark 43-1, and the pinned magnetic layer, the nonmagnetic layer and the free magnetic layer are collectively indicated by a reference mark 43-2.

In the MR head 60 shown in FIG. 13, the underlying layer 63 under the antiferromagnetic layer 43-1 of the spin-valve film 43 extends transversely with a uniform thickness. The tantalum-(Ta)-group metal layer 65-1, the tungsten-(W)-group metal layer 65-2 and the hard film 66 are laminated on this underlying layer 63. The hard-film underlying layer 65 (the tantalum-(Ta)-group metal layer 65-1 and the tungsten-(W)-group metal layer 65-2) and the hard film 66 shown in FIG. 13 are formed of Ta (3 nm)/W$_{95at\%}$Ti$_{5at\%}$ (3 nm) and CoCrPt, respectively.

The underlying layer 63 shown in FIG. 13 may be formed of properly selected materials. However, since the underlying layer 63 underlies the antiferromagnetic layer 43-1, the underlying layer 63 is preferably formed of two layers of Ta/NiFe, two layers of Ta/NiFeCr-alloy, or a single layer of NiCr-alloy.

Figure 1:
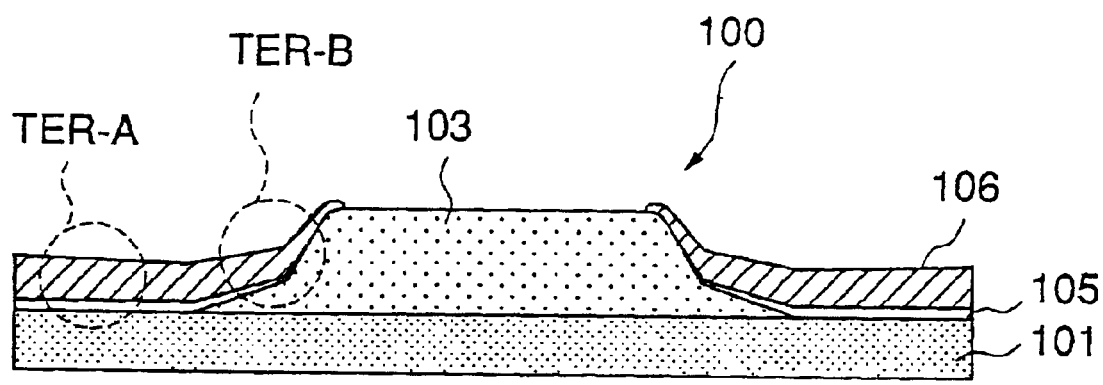
FIG. 1 shows a basic structure of a conventional spin-valve-type MR head.
Figure 2A:
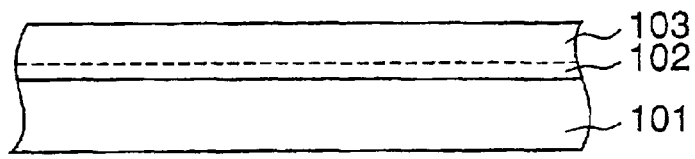
FIG. 2A is a first illustration of manufacturing steps of the conventional spin-valve-type MR head.
Figure 2B:
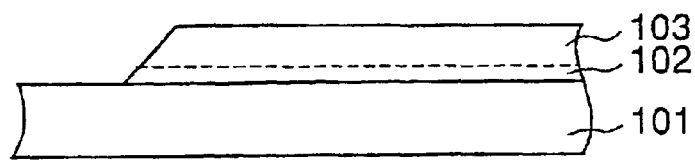
FIG. 2B is a second illustration of the manufacturing steps of the conventional spin-valve-type MR head.
Figure 2C:
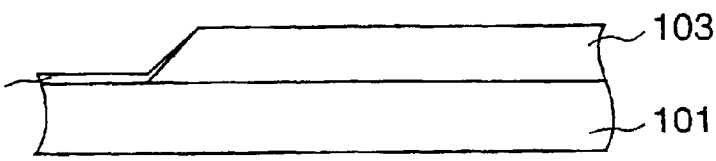
FIG. 2C is a third illustration of the manufacturing steps of the conventional spin-valve-type MR head.
Figure 2D:
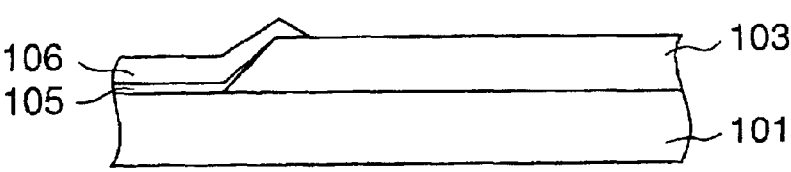
FIG. 2D is a fourth illustration of the manufacturing steps of the conventional spin-valve-type MR head.
Figure 2E:
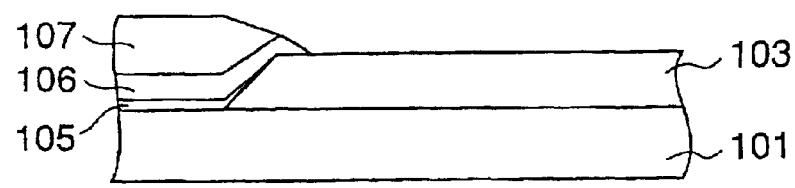
FIG. 2E is a fifth illustration of the manufacturing steps of the conventional spin-valve-type MR head.
Figure 2F:
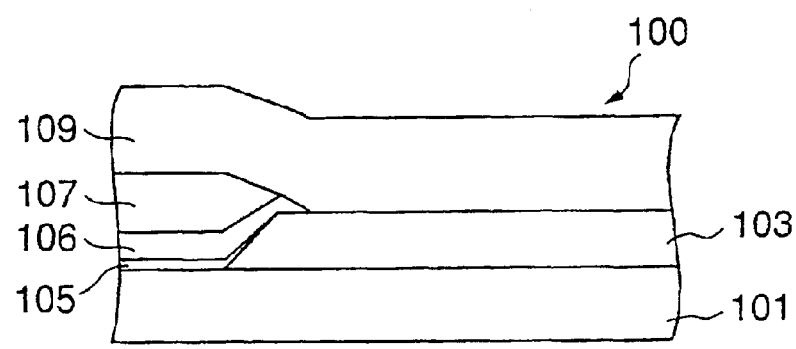
FIG. 2F is a sixth illustration of the manufacturing steps of the conventional spin-valve-type MR head.
Figure 3A:
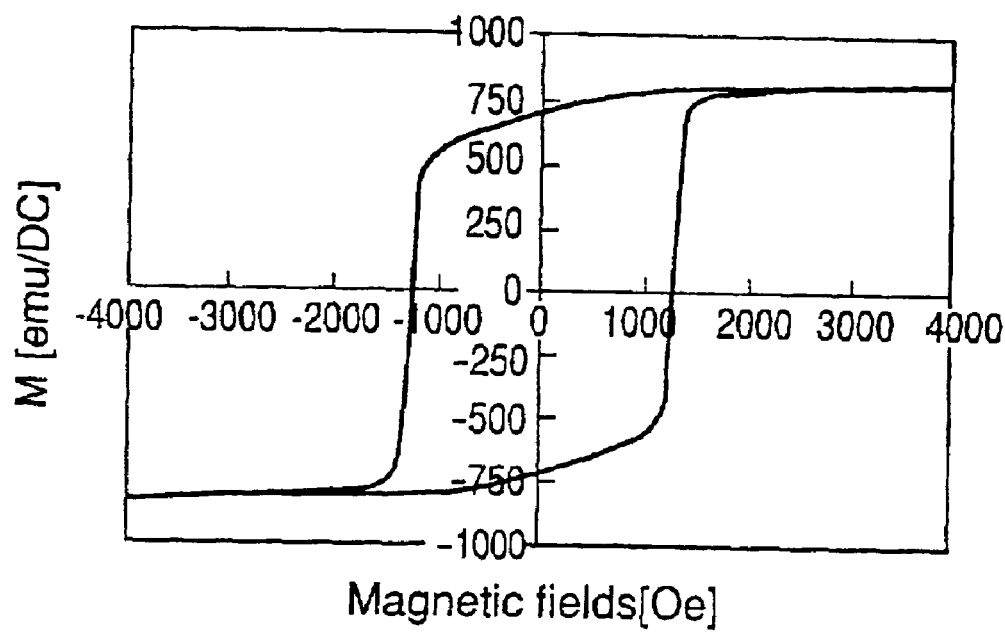
FIG. 3A shows a magnetic characteristic of a hard film of the conventional spin-valve-type MR head in a territory TER-A shown in FIG. 1.
Figure 3B:
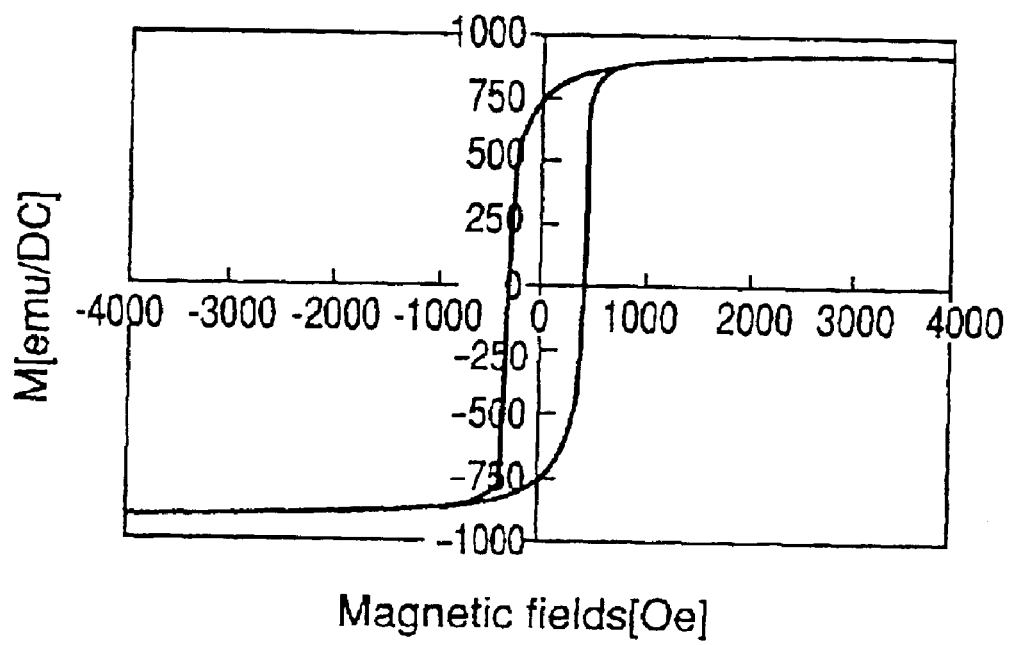
FIG. 3B shows a magnetic characteristic of the hard film of the conventional spin-valve-type MR head in a territory TER-B shown in FIG. 1.
Figure 4:
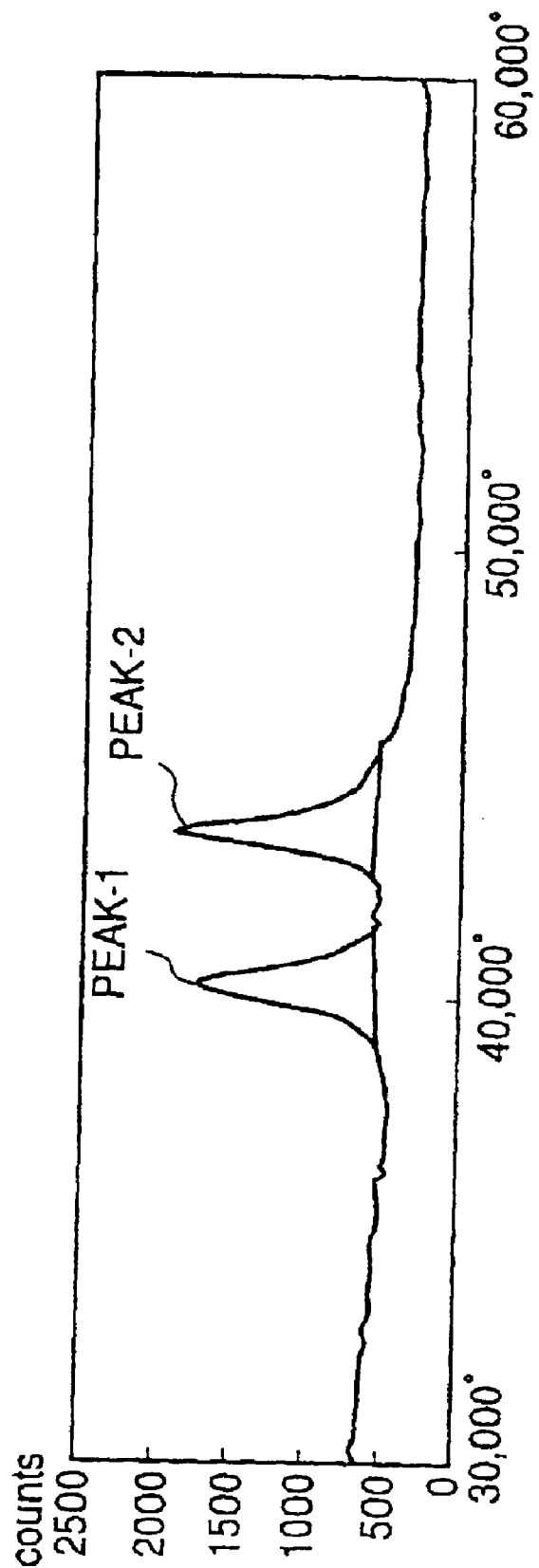
FIG. 4 shows, by using an X-ray diffraction, a hard film having a deteriorated crystallinity in the conventional spin-valve-type MR head.
Figure 5A:
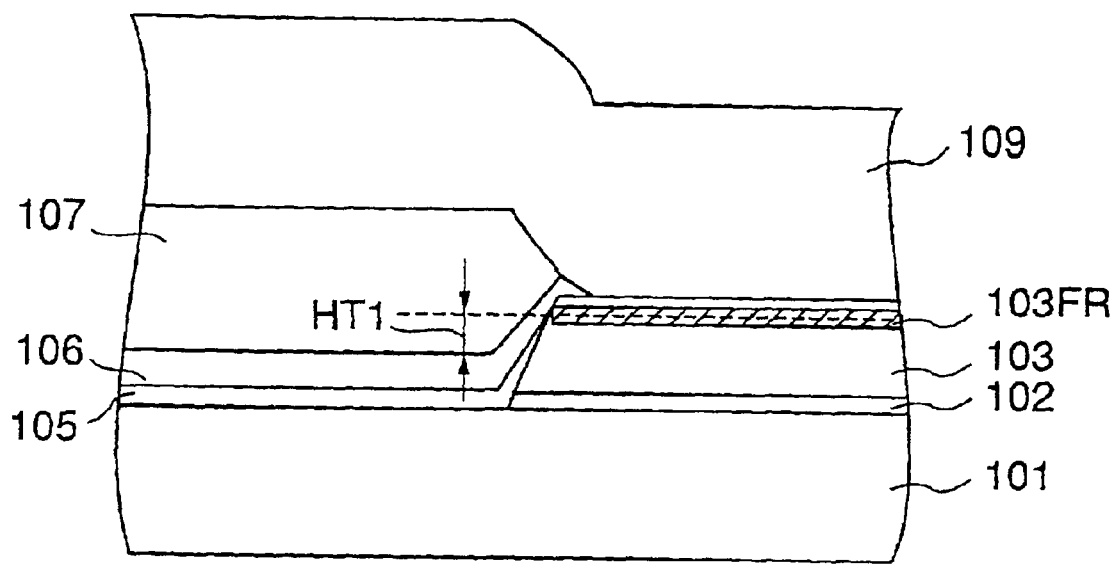
FIG. 5A is a magnified view showing a state of the conventional spin-valve-type MR head having thinner films, with a spin-valve film employing a reverse-order laminated structure.
Figure 5B:
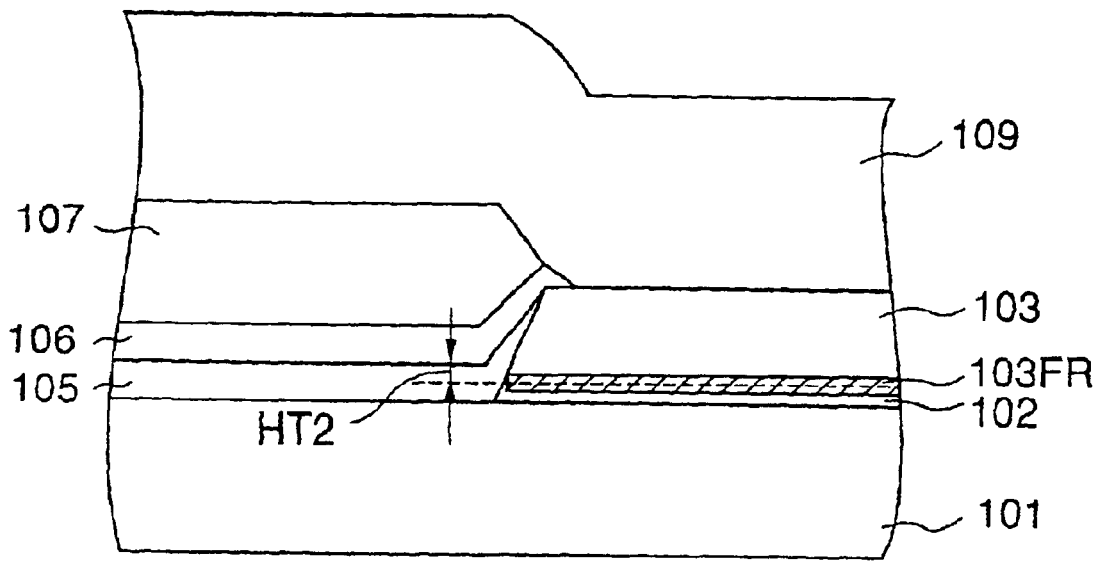
FIG. 5B is a magnified view showing a state of the conventional spin-valve-type MR head having thinner films, with the spin-valve film employing the regular-order laminated structure.
Figure 6A:
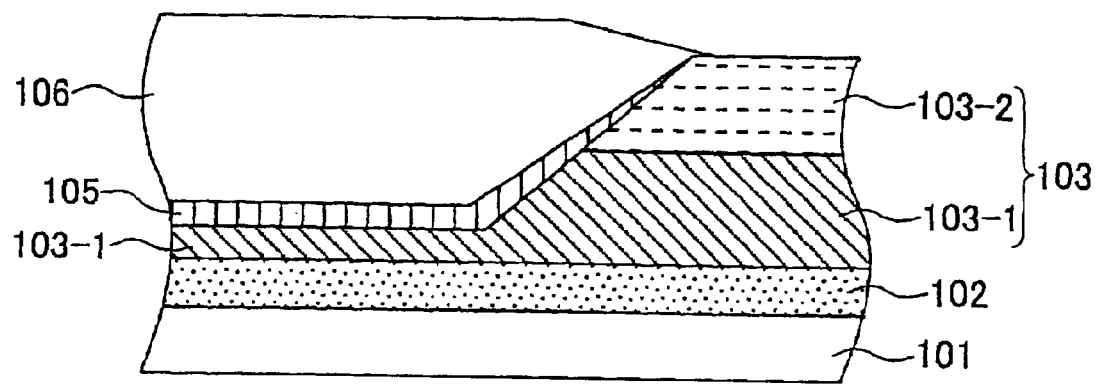
FIG. 6A and FIG. 6B illustrate a conventional technology of raising the bottom of the hard film.
Figure 6B:
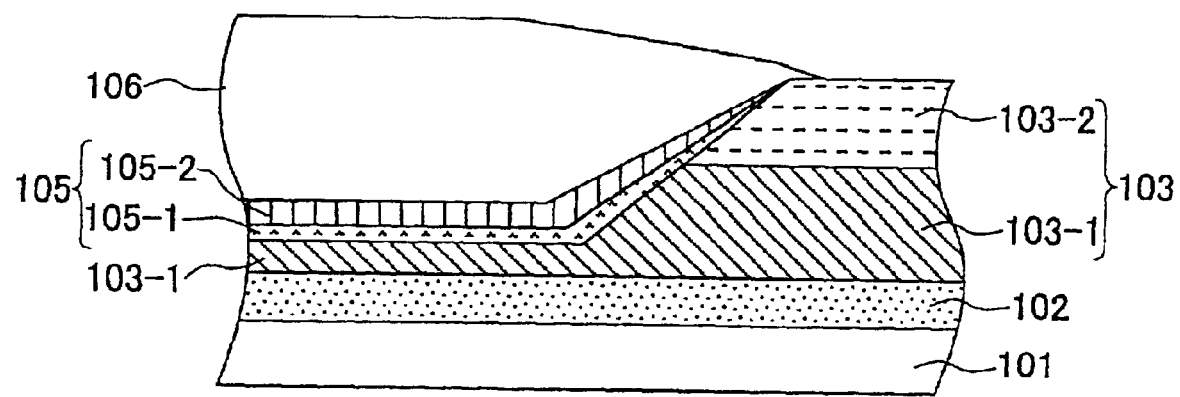
Figure 7:
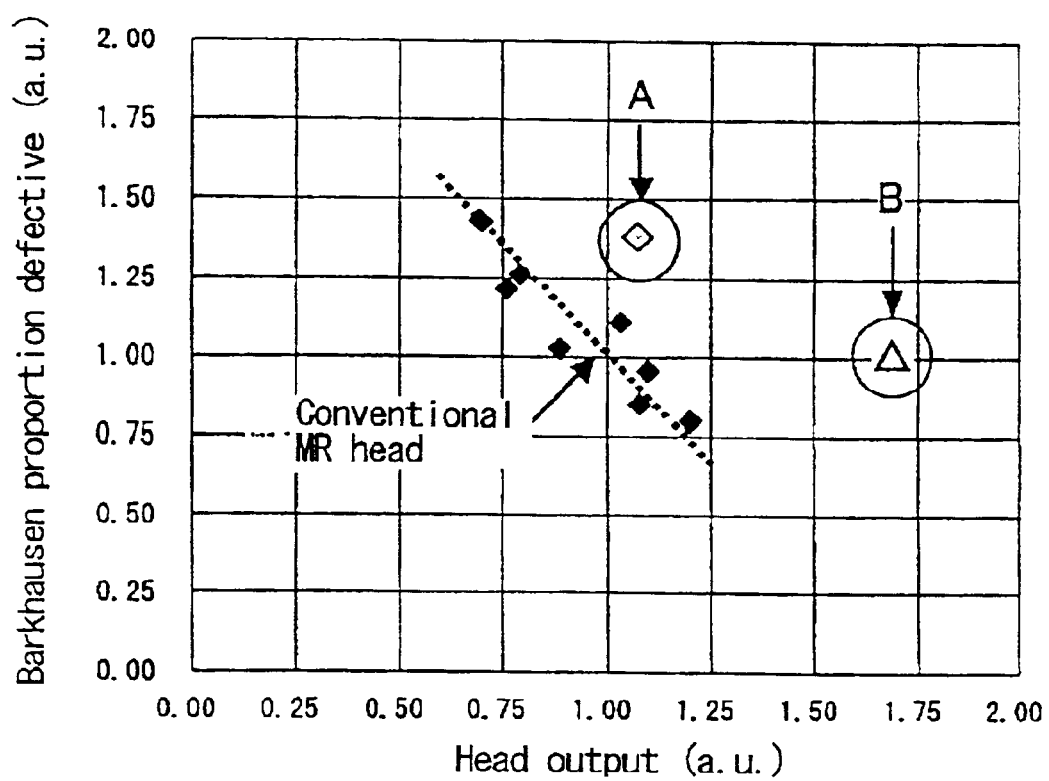
FIG. 7 shows a result of comparing a conventional MR head that does not have an antiferromagnetic layer under an underlying layer formed for the hard film, with MR heads shown in FIG. 6A and FIG. 6B each having the underlying layer formed on the antiferromagnetic layer.

FIG. 14 shows a relationship between a head output and a Barkhausen proportion defective of the MR head 60 shown in FIG. 13. FIG. 14 corresponds to FIG. 7 in the foregoing. In FIG. 14 as well, the conventional general MR head is referenced in comparison, with criterion values being 1.00. The head output and the Barkhausen proportion defective of the MR head 60 shown in FIG. 13 are indicated by a black square in a circle shown in FIG. 14. In the conventional general MR head (see FIG. 2F) referenced in this comparison, the hard-film underlying layer has a single layer of Cr (3 nm), and the underlying layer for the spin-valve film is not formed under the hard-film underlying layer.

FIG. 14 shows that the head output of the MR head 60 shown in FIG. 13 is increased, and the Barkhausen proportion defective is decreased, compared to the conventional general MR head.

FIG. 15 shows a magnetic characteristic of the hard film 66 of the MR head 60 shown in FIG. 13. FIG. 15 shows a remarkable improvement of the magnetic characteristic of the hard film 66 formed of CoCrPt on the underlying layer 63 with the hard-film underlying layer 65 (the two layers of Ta/WTi) therebetween.

In this specific example, by adding titanium (Ti) to the tungsten-(W)-group metal layer 65-2, the electrical conductivity is improved. Additionally, although FIG. 13 shows the underlying layer 63 extending under the hard film 66 with a uniform thickness, the underlying layer 63 may be formed thin, and thereafter, the tantalum-(Ta)-group metal layer 65-1 and the tungsten-(W)-group metal layer 65-2 may be formed thereon, as occasion demands. Further, a chromium-(Cr)-group metal layer may be formed on the tungsten-(W)-group alloy layer.

Further, a description will be given of the sixth embodiment of the present invention. The sixth embodiment of the present invention is an MR head including a spin-valve film having the reverse-order laminated structure, as in FIG. 13 of the fifth embodiment. In the present sixth embodiment, the antiferromagnetic layer of the spin-valve film is left under the hard-film underlying layer so as to raise the bottom of the hard film.

As pointed out in relation with the conventional problems, simply raising the bottom of the hard film by leaving the antiferromagnetic layer thereunder tends to deteriorate the magnetic characteristic of the hard film. However, by employing a structure according to the present embodiment, the antiferromagnetic layer can be used to raise the bottom of the hard film while restraining an ill influence of the antiferromagnetic layer.

Figure 16:
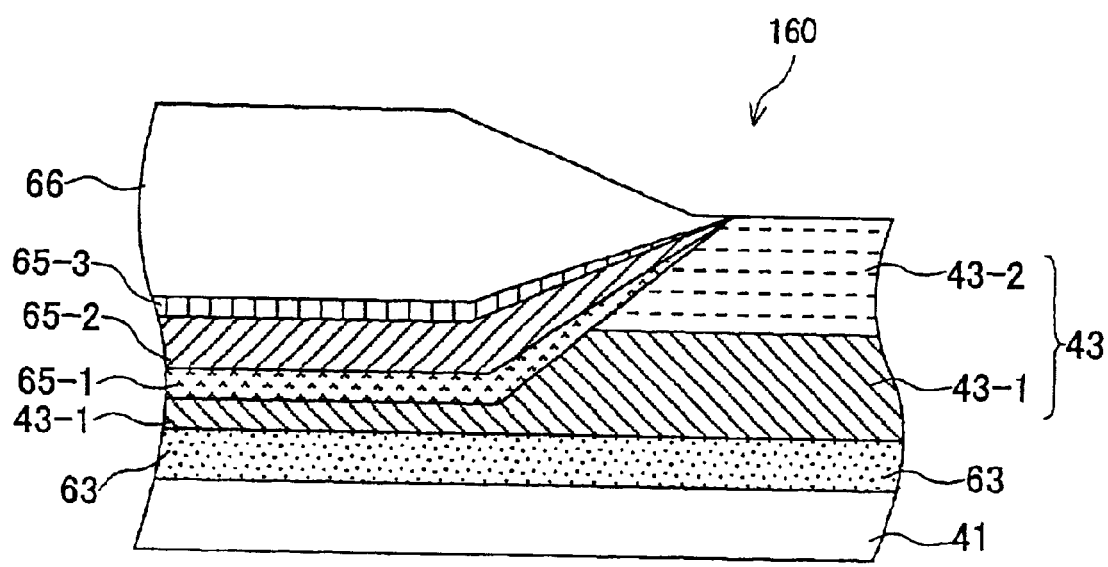
FIG. 16 is a drawing regarding an MR head according to a sixth embodiment of the present invention.
Figure 17:
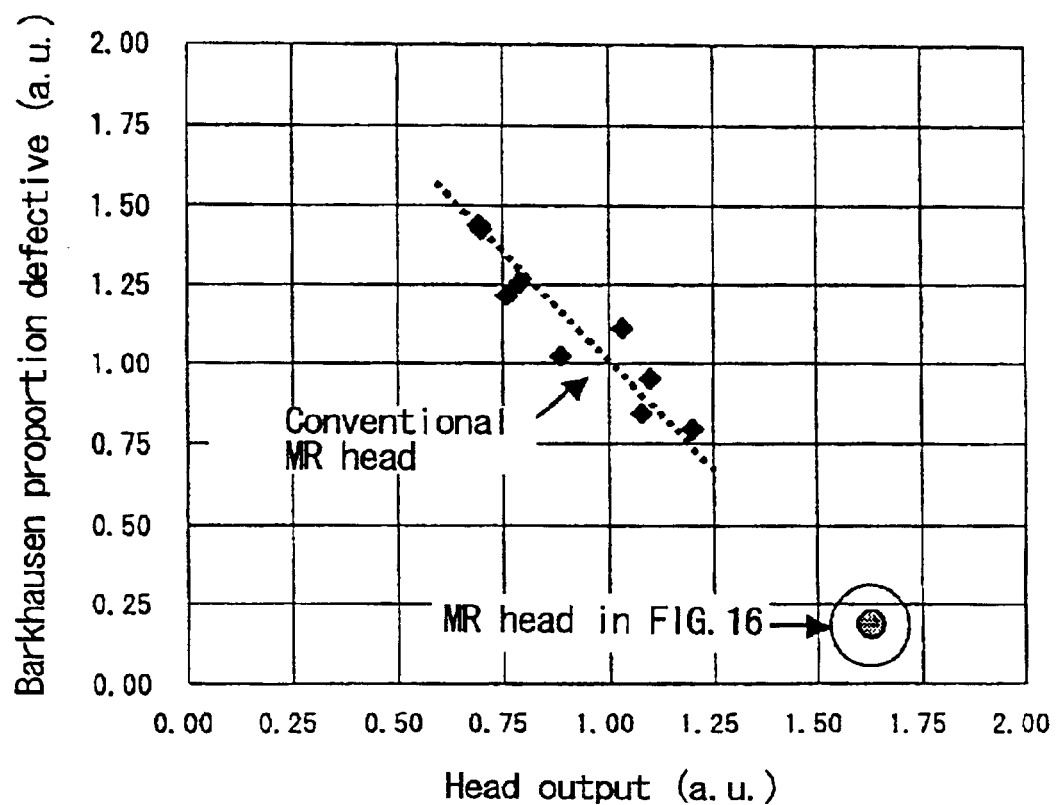
FIG. 17 shows a relationship between a head output and a Barkhausen proportion defective of the MR head shown in FIG. 16.
Figure 18:
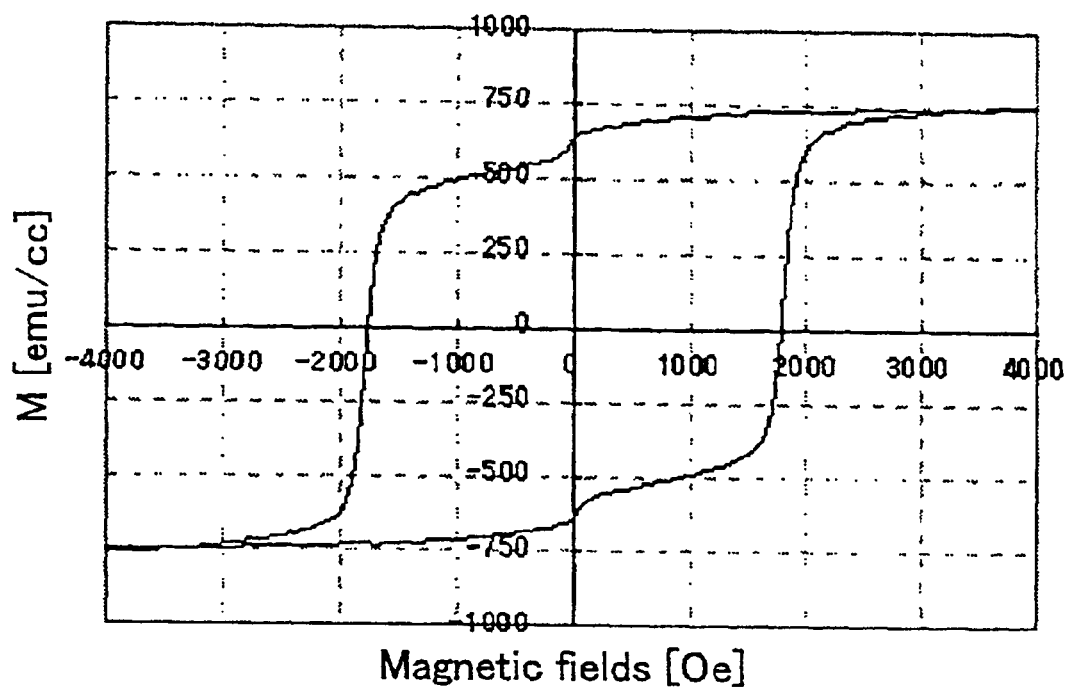
FIG. 18 shows a magnetic characteristic of the hard film of the MR head shown in FIG. 16.

FIG. 16 to FIG. 18 are drawings regarding an MR head 160 according to the present sixth embodiment. FIG. 16 is a magnified view of the vicinity of a joint of the spin-valve film 43 and the hard film 66 of the MR head 160. Elements in FIG. 16 that are identical or equivalent to the elements of the MR head 60 according to the fifth embodiment are referenced by the same reference marks.

In the MR head 160 according to the present sixth embodiment shown in FIG. 16, a part of the antiferromagnetic layer 43-1 of the spin-valve film 43 (a magnetoresistance film) is left under the hard-film underlying layer 65. The antiferromagnetic layer 43-1 can be formed of PdPtMn, for example.

In general, the spin-valve film 43 is so formed that each layer therein is laminated widely so as to secure an enough width to detect a magnetic field, and both ends thereof are removed by patterning. In the present embodiment, upon this patterning, a part of the antiferromagnetic layer 43-1 is left as a residual film, and the hard-film underlying layer 65 is formed on this residual film. Thus, the part of the antiferromagnetic layer 43-1 is not wasted in the patterning, but is efficiently used to raise the bottom of the hard film.

The hard-film underlying layer 65 according to the present sixth embodiment is formed of three layers. The hard-film underlying layers 65-1, 65-2 and 65-3 in FIG. 16 are formed of Ta (3 nm)/W$_{95at\%}$Ti$_{5at\%}$ (7 nm)/Cr (3 nm), respectively. The hard film 66 is formed of CoCrPt.

FIG. 17 shows a relationship between a head output and a Barkhausen proportion defective of the MR head 160 shown in FIG. 16. FIG. 17 corresponds to FIG. 7 described in the foregoing. In FIG. 17 as well, the conventional general MR head is referenced in comparison, with criterion values being 1.00. The head output and the Barkhausen proportion defective of the MR head 160 shown in FIG. 16 are indicated by a black circle in FIG. 17. In the conventional general MR head (see FIG. 2F) referenced in this comparison, the hard-film underlying layer has a single layer of Cr (3 nm), and the underlying layer for the spin-valve film and the antiferromagnetic layer of the spin-valve film are not formed under the hard-film underlying layer.

FIG. 17 shows that the head output of the MR head 160 shown in FIG. 16 is increased, and the Barkhausen proportion defective is decreased, compared to the conventional general MR head.

FIG. 18 shows a magnetic characteristic of the hard film 66 of the MR head 160 shown in FIG. 16. FIG. 18 shows that the hard-film underlying layer 65 having the three layers of Ta/WTi/Cr improves the magnetic characteristic of the hard film 66 formed of CoCrPt above the antiferromagnetic layer 43-1 on the underlying layer 63.

In the present sixth embodiment, by adding titanium (Ti) to the tungsten-(W)-group metal layer (65-2), the electrical conductivity is improved. Additionally, although FIG. 16 shows the antiferromagnetic layer 43-1 (PdPtMn) extending under the hard film 66 with a thinned-down thickness, the antiferromagnetic layer 43-1 may not necessarily be thinned down, but may be used with an original thickness thereof. Further, the antiferromagnetic layer 43-1 may be formed of PtMn.

By using the hard-film underlying layer 65 having the three layers of Ta/WTi/Cr as in the present embodiment, a conventionally problematic influence of the antiferromagnetic layer can be restrained. Thereby, the antiferromagnetic layer can be used to raise the bottom of the hard film 66. Besides, although the hard-film underlying layer 65 according to the present sixth embodiment is formed of the three layers, the hard-film underlying layer described in the first or second embodiment can be applied to the MR head 160 according to the present sixth embodiment. For example, the hard-film underlying layer 65 may be formed of the two layers of Ta/Wti.

Additionally, although the present embodiment sets forth an example where the antiferromagnetic layer 43-1 is left under the hard-film underlying layer 65, other layers may also be left thereunder.

Further, a description will be given of the seventh embodiment of the present invention. The seventh embodiment of the present invention is an MR head 70 including a spin-valve film having the regular-order laminated structure. The free magnetic layer 43FR in the spin-valve film of an MR head like this MR head 70 is located near the bottom of the spin-valve film, and thus in some cases, a hard film may be formed at a position shifted upward from the position of the free magnetic layer. The present seventh embodiment lowers the bottom of the hard film by etching and cutting out parts of the insulating layer exposed on both sides by the patterning of the spin-valve film. Forming thereon the hard-film underlying layer and the hard film brings the hard film to a position corresponding to the free magnetic layer 43FR.

Figure 19A:
FIG. 19A to FIG. 19F show manufacturing steps in sequence of an MR head according to a seventh embodiment of the present invention.
Figure 19B:
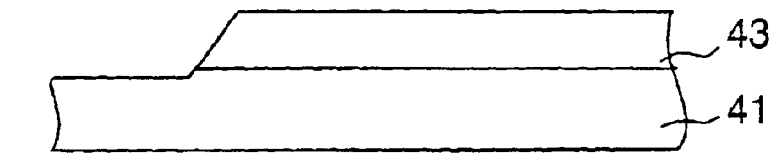
Figure 19C:
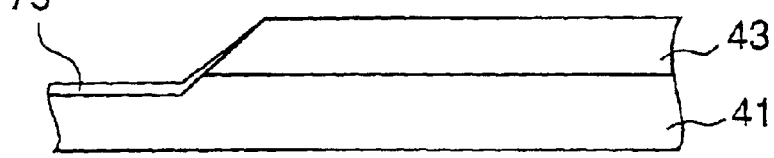
Figure 19D:
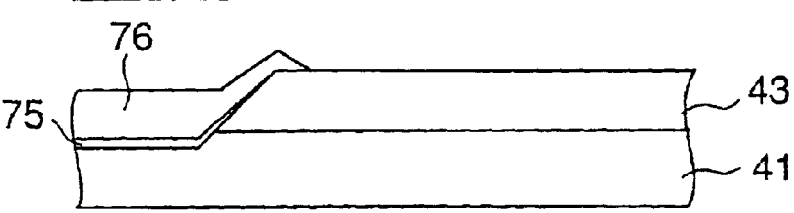
Figure 19E:
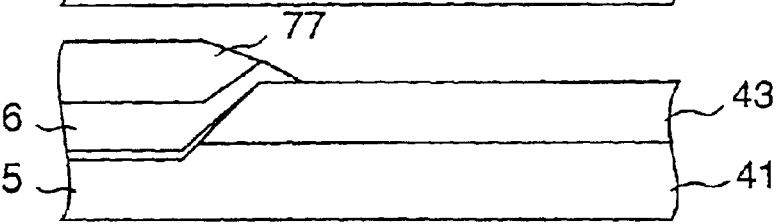
Figure 19F:
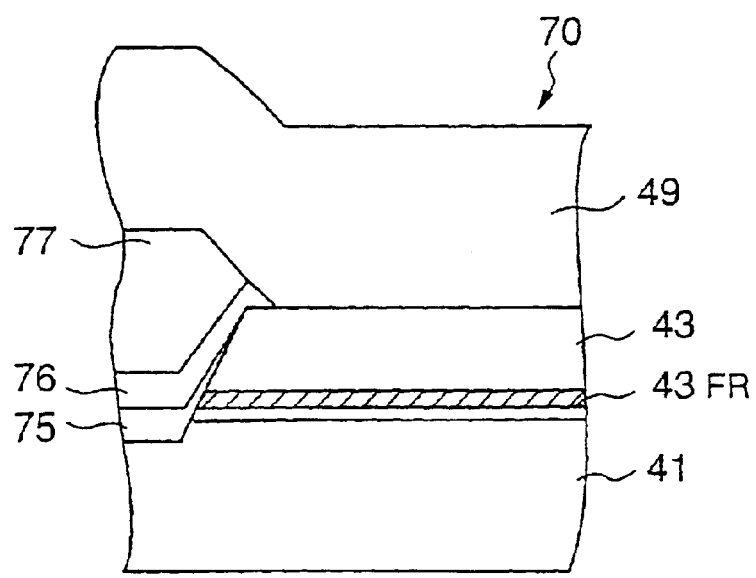

FIG. 19A to FIG. 19F are drawings regarding the MR head 70 according to the seventh embodiment of the present invention. FIG. 19A to FIG. 19F show manufacturing steps of the MR head 70 in sequence, and FIG. 19F shows an outline of a structure of the MR head 70 in the final form. Since the manufacturing steps shown in FIG. 19A to FIG. 19F are also similar or analogous to the manufacturing steps shown in FIG. 10A to FIG. 10F, elements in FIG. 19A to FIG. 19F that are identical or equivalent to the elements shown in FIG. 10A to FIG. 10F are referenced by the same reference marks, and will not be described in duplication; but mainly, different elements will be described.

A step shown in FIG. 19A is identical to the step shown in FIG. 10A. However, in a step of patterning the spin-valve film 43 shown in FIG. 19B, after completion of the patterning of the spin-valve film 43 itself, parts of the insulating layer 41 exposed on both sides are further etched. By cutting out these parts of the insulating layer 41 so that the remaining parts of the insulating layer 41 on both sides become lower than a part of the insulating layer 41 under the spin-valve film 43, the hard-film underlying layer and the hard film, which are to be formed in the following steps, can be positioned lower in height.

The amount of the insulating layer 41 to be etched is determined in consideration of the thickness of the hard-film underlying layer and the hard film so that the hard film is to be formed at a position corresponding to the free magnetic layer 43FR.

FIG. 19C shows a step of forming a hard-film underlying layer 75. The bottom of the hard-film underlying layer 75 is lowered. Therefore, a hard film 76, which is to be formed on this hard-film underlying layer 75, can be arranged at a position corresponding to the free magnetic layer 43FR of the spin-valve film 43.

FIG. 19D shows a step of forming the hard film 76 on the hard-film underlying layer 75 so that the hard film 76 contacts each end of the spin-valve film 43. As mentioned above, the hard film 76 is arranged at a position corresponding to the free magnetic layer 43FR of the spin-valve film 43.

FIG. 19E shows a step of forming a conductive lead-out layer 77 on the hard film 76. The conductive lead-out layer 77 is to be used to electrically take out a magnetoresistance change in the spin-valve film 43. Finally, FIG. 19F shows a step of forming the insulating layer 49 on the spin-valve film 43 and the conductive lead-out layer 77. The heretoforementioned steps shown in FIG. 19A to FIG. 19F form the MR head 70 according to the present embodiment.

In the MR head 70 according to the present embodiment, the hard film 76 is arranged at the position corresponding to the free magnetic layer 43FR of the spin-valve film 43. Therefore, in the MR head 70, the hard film 76 effectively regulates a magnetic domain of the free magnetic layer 43FR.

Further, applying the hard-film underlying layer described in the first or second embodiment improving a crystallinity of the hard film to the MR head 70 according to the present seventh embodiment makes the MR head 70 more preferable.

Figure 20:
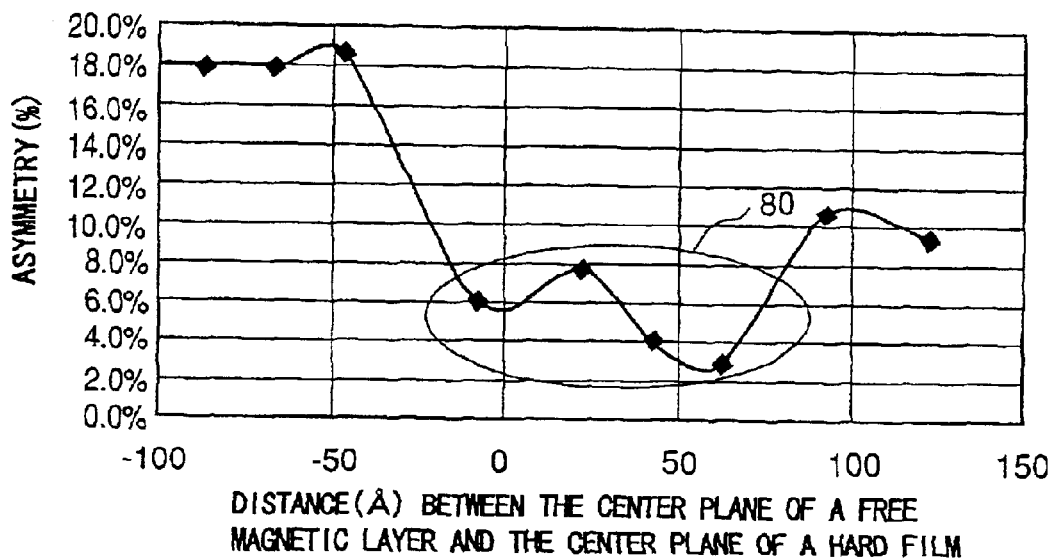
FIG. 20 shows an asymmetry change in a reproduction output of an MR head, as the position of the center plane of a free magnetic layer is varied with respect to the center plane of a hard film.
Figure 21:
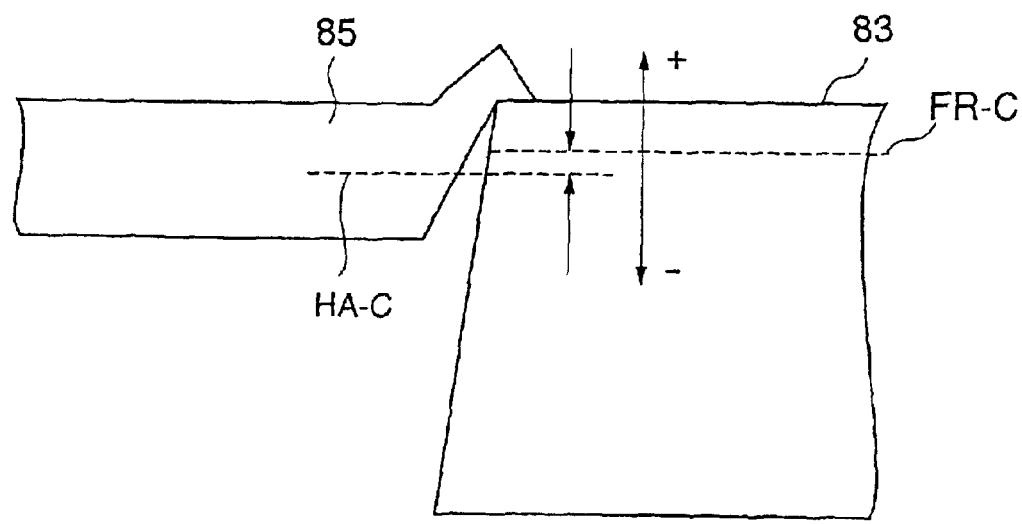
FIG. 21 is a magnified view of the vicinity of a free magnetic layer of a spin-valve film and a hard film, showing the positional relation therebetween.

FIG. 20 and FIG. 21 are drawings regarding positions of a free magnetic layer and a hard film of an MR head. The above-described third to seventh embodiments set forth a plurality of the MR heads having the hard film, which is prone to be formed at a position shifted in the direction of thickness, arranged at a position corresponding to the free magnetic layer. The following description will be made of a preferable positional relation between the hard film and the free magnetic layer.

FIG. 20 shows an asymmetry change in a reproduction output of an MR head, as the position of the center plane of a free magnetic layer is varied in the direction of thickness with respect to the center plane of a hard film. FIG. 21 is a magnified view of the vicinity of a free magnetic layer 43FR of a spin-valve film (a magnetoresistance film) 83 and a hard film 85, showing the positional relation therebetween. It is noted that the center plane here means a plane that is parallel to a surface of the respective layer or film and is located at the center in the direction of thickness.

The inventors of the present invention examined positional relations between the center plane of the hard film and the center plane of the free magnetic layer. The inventors formed a hard film 300 Å thick and a free magnetic layer 40 Å thick as an example, and made an MR head on an experimental basis having the center plane of the hard film and the center plane of the free magnetic layer arranged at different positions so as to measure the influence on a reproduction output.

In FIG. 20, the axis of abscissas indicates the distance (Å) between the center plane of the free magnetic layer and the center plane of the hard film, and the axis of ordinates indicates the asymmetry of a waveform of a reproduction output by the MR head for each case.

With reference to FIG. 21, 0 (zero) on the axis of abscissas in FIG. 20 represents that a center plane HA-C of the hard film 85 and a center plane FR-C of the free magnetic layer 43FR are positioned at the same height. As the abscissa indicates greater (to the right in FIG. 20) on the + (plus) side, this means that the free magnetic layer 43FR is positioned higher than the hard film 85. To the contrary, as the abscissa indicates greater (to the left in FIG. 20) on the − (minus) side, this means that the free magnetic layer 43FR is positioned lower than the hard film 85. On the axis of ordinates, the lower the better the asymmetry of the reproduction output of an MR head is, and thus the asymmetry is preferred to be restricted within approximately 9% as indicated by an ellipse 80 in FIG. 20.

This preferable range, seen on the axis of abscissas, shows that the center plane FR-C of the free magnetic layer 43FR is positioned lower than the center plane HA-C of the hard film 85 merely by approximately 30 Å. This accounts for 10% of the thickness of 300 Å of the hard film 85.

By contrast, the center plane FR-C of the free magnetic layer 43FR is positioned higher than the center plane HA-C of the hard film 85 by as much as approximately 80 Å. This accounts for approximately 27% of the thickness of 300 Å of the hard film 85.

The results above show that, in forming an MR head, the center plane of a free magnetic layer is preferred to be positioned within the range from the position corresponding to the center plane of a hard film to the position higher by 25% of the thickness of the hard film.

Therefore, in manufacturing the MR heads according to the above-mentioned third to seventh embodiments, designing such that the center plane of the free magnetic layer and the center plane of the hard film represent this preferable positional relation can present an optimal magnetic-domain regulation of the free magnetic layer, and thus can provide the MR heads with higher sensitivity.

Whereas the above-described first to seventh embodiments employ a spin-valve film having a reverse-order laminated structure or a regular-order laminated structure as a magnetoresistance film, the present invention is not limited to these embodiments. That is, the first and second embodiments may employ a spin-valve film of a regular-order laminated structure. Furthermore, in the first to seventh embodiments, the present invention is applicable also to a magnetoresistance film of a lamination type, such as a tunnel-effect film, and a magnetoresistance film of a single-layer type.

Although each of the above-described embodiments sets forth the MR head that can reproduce a signal magnetic field from a magnetic recording medium with high sensitivity, it is clear that arranging the MR head according to the present invention together with a conventional inductive thin-film head can realize a recording and reproducing head.

Figure 22:
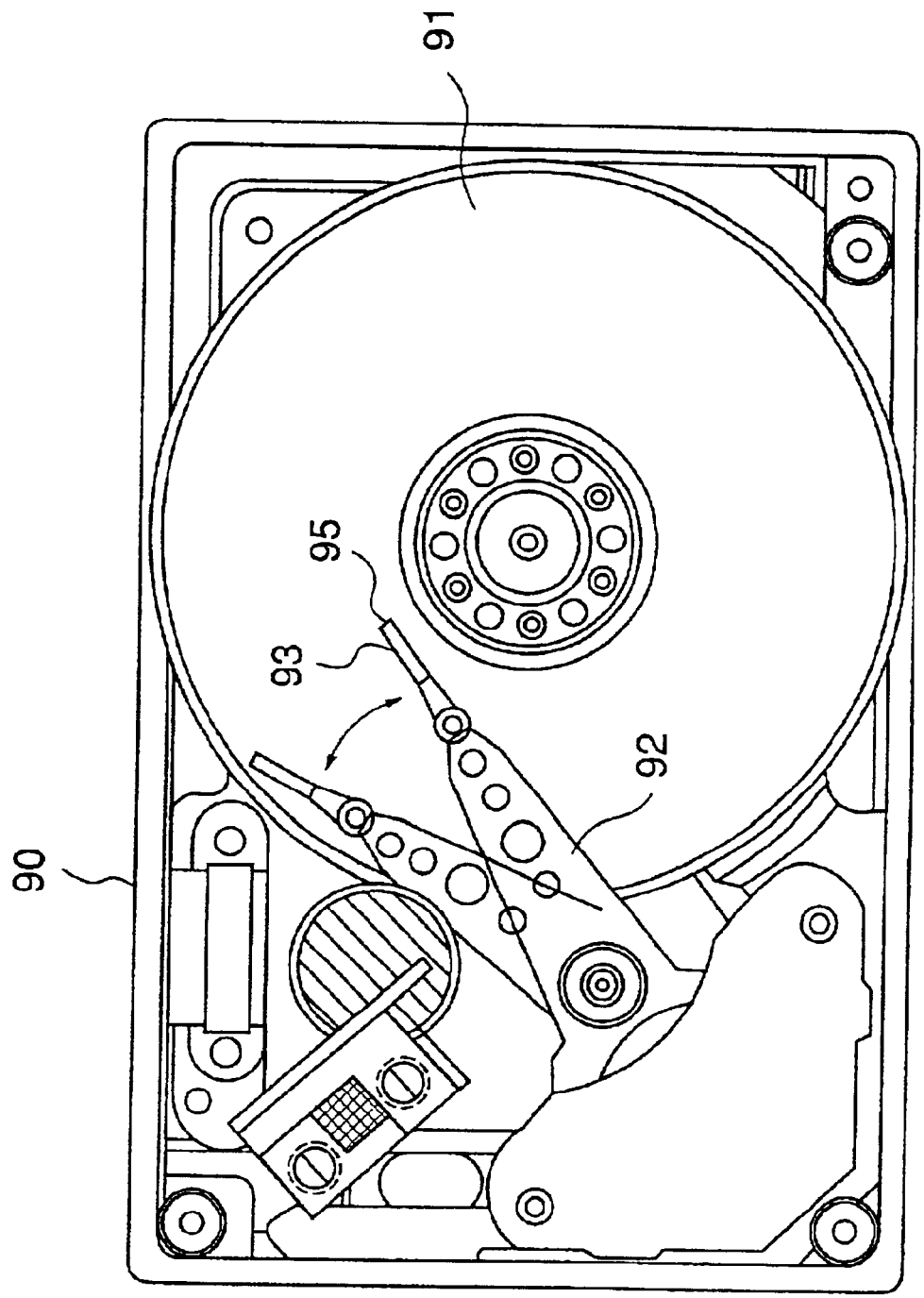
FIG. 22 is an illustration of a main structure of a recording and reproducing device for a magnetic recording medium.

Next, a description will be given of a recording and reproducing device for a magnetic recording medium, the recording and reproducing device having the MR head according to the above-mentioned embodiments mounted therein. FIG. 22 is an illustration of a main structure of the recording and reproducing device. A recording and reproducing device 90 for a magnetic recording medium has a hard disk 91 mounted therein as a magnetic recording medium that is caused to rotate. A complex magnetic head 95 includes, for example, the MR head 10 according to the first embodiment for reproduction, the MR head 10 facing the surface of the hard disk 91 with a predetermined distance therebetween. A magnetic reproduction is performed by the complex magnetic head 95. The complex magnetic head 95 is fixed on the tip of a slider 93 at the end of an arm 92. The complex magnetic head 95 can be positioned by using a two-stage actuator combining a normal actuator and an electromagnetic tremor actuator.

The present invention is not limited to the specifically disclosed embodiments, and variations and modifications may be made without departing from the scope of the present invention.

The present application is based on Japanese priority applications No.2001-039248 filed on Feb. 15, 2001 and No.2001-230049 filed on Jul. 30, 2001, the entire contents of which are hereby incorporated by reference.

What is claimed is:

1. A magnetic head of a magnetoresistance type, the magnetic head comprising:
   a magnetoresistance film;
   an underlying layer formed on each of both sides of said magnetoresistance film, the underlying layer having a laminated structure of a tungsten-(W)-group metal layer formed on a tantalum-(Ta)-group metal layer, wherein the tungsten-(W)-group metal does not include chromium (Cr); and
   a magnetic-domain regulating film formed on the top of said underlying layer so as to regulate a magnetic domain of said magnetoresistance film,
   wherein said magnetoresistance film contacts the under-surface of said underlying layer.

2. The magnetic head of the magnetoresistance type as claimed in claim 1, wherein said laminated structure further includes a chromium-(Cr)-group metal layer formed on said tungsten-(W)-group metal layer.

3. The magnetic head of the magnetoresistance type as claimed in claim 2, wherein said chromium-(Cr)-group metal layer is a layer alloyed with at least one selected from a group consisting of molybdenum (Mo), vanadium (V) and tungsten (W).

4. The magnetic head of the magnetoresistance type as claimed in claim 1, wherein said tungsten-(W)-group metal layer is a layer alloyed with at least one selected from a group consisting of titanium (Ti) and vanadium (V).

5. The magnetic head of the magnetoresistance type as claimed in claim 1, wherein said tungsten-(W)-group metal layer is 1.7 to 10 nm in thickness.

6. A magnetic reproducing device for reproducing magnetic information from a magnetic recording medium, the device comprising:
   a magnetic head of a magnetoresistance type, the magnetic head including:
   a magnetoresistance film;
   an underlying layer formed on each of both sides of said magnetoresistance film, the underlying layer having a laminated structure of a tungsten-(W)-group metal layer formed on a tantalum-(Ta)-group metal layer, wherein the tungsten-(W)-group metal does not include chromium (Cr); and
   a magnetic-domain regulating film formed on the top surface of said underlying layer so as to regulate a magnetic domain of said magnetoresistance film,
   wherein said magnetoresistance film contacts the under-surface of said underlying layer.

* * * * *